US012711106B2

(12) United States Patent
Frison

(10) Patent No.: US 12,711,106 B2
(45) Date of Patent: Aug. 18, 2026

(54) ENCODED DATA STORAGE

(71) Applicant: SAP SE, Walldorf (DE)

(72) Inventor: Giancarlo Frison, Mammendorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/972,932

(22) Filed: Dec. 7, 2024

(65) Prior Publication Data

US 2026/0161610 A1 Jun. 11, 2026

(51) Int. Cl.

*G06F 16/00* (2019.01)
*G06F 16/182* (2019.01)
*G06F 3/06* (2006.01)

(52) U.S. Cl.

CPC .......... *G06F 16/182* (2019.01); *G06F 3/0608* (2013.01); *G06F 3/0655* (2013.01); *G06F 3/0679* (2013.01)

(58) Field of Classification Search

CPC .... G06F 3/0608; G06F 3/0655; G06F 3/0679; G06F 16/1827
USPC .................................................. 707/600–899
See application file for complete search history.

(56) References Cited

U.S. PATENT DOCUMENTS

| | | | | |
|---|---|---|---|---|
| 10,095,738 | B1 * | 10/2018 | Caldwell | G06F 16/9535 |
| 11,113,267 | B2 * | 9/2021 | Carter | G06F 16/2365 |
| 2018/0357328 | A1 * | 12/2018 | Meyer | G06F 16/9024 |
| 2019/0102430 | A1 * | 4/2019 | Wang | G06N 7/01 |
| 2020/0004736 | A1 * | 1/2020 | Liu | G06F 16/2455 |
| 2021/0026894 | A1 * | 1/2021 | Yang | G06F 16/9024 |
| 2021/0240685 | A1 * | 8/2021 | Nawathe | G06F 16/2455 |

* cited by examiner

*Primary Examiner* — Michelle N Owyang
(74) *Attorney, Agent, or Firm* — SCHWEGMAN LUNDBERG & WOESSNER, P.A.

(57) ABSTRACT

Various examples are directed to systems and methods of storing data in a computing system. An application may access argument data describing a first argument value. The application may access a first record from a node data structure using the first argument value, the first record from the node data structure describing a first argument identifier and a first node predicate position record from a node predicate position data structure using the first argument identifier. The application may access a first position predicate node record from a position predicate node data structure using the first predicate instance identifier and a second position identifier. The application may return first predicate instance data describing the first predicate instance, the first argument value at the first predicate instance position of the first predicate instance, and a second argument value at the second predicate instance position of the first predicate instance.

20 Claims, 13 Drawing Sheets

ENCODED DATA STORAGE

BACKGROUND

Analytics computing systems are implemented for enterprises, such as business enterprises, to provide analysis of data. An analytics computing system may include software and/or hardware that are arranged to gather, integrate, analyze, and/or present insights regarding underlying data to various users.

The underlying data may be stored at one or more database management systems. One consistent challenge associated with analytics computing systems is determining how to query the database management system or systems in a manner that returns desired data.

BRIEF DESCRIPTION OF DRAWINGS

The present disclosure is illustrated by way of example and not limitation in the following figures.

DETAILED DESCRIPTION

Figure 1:
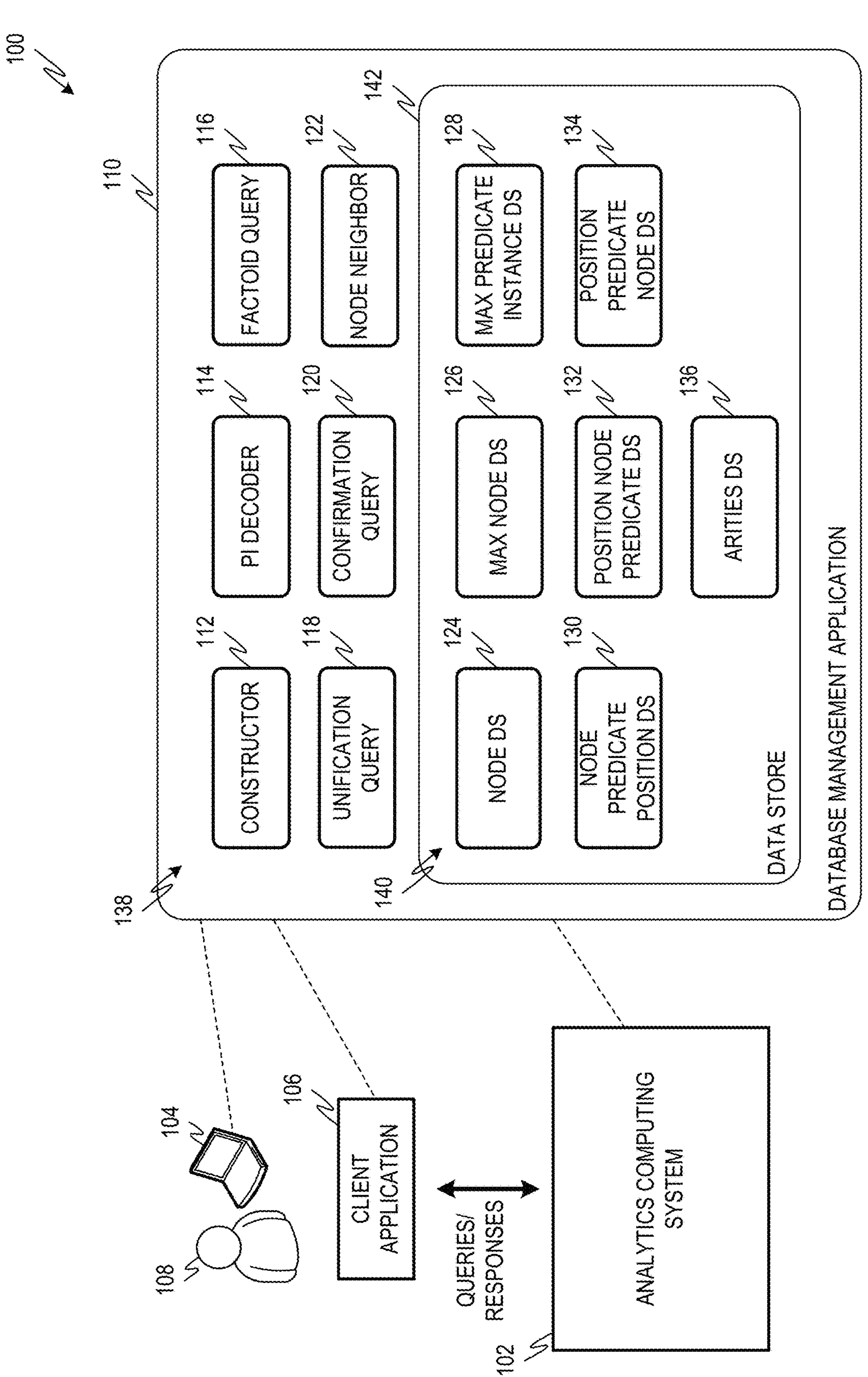
FIG. 1 is a diagram showing one example of an environment for implementing encoded data storage.

Analytics computing systems can provide enterprises with detailed analysis of data from different data sources. An analytics computing system is programmed to reflect business processes, technical processes, and/or other processes or systems. The analytics computing system accesses and analyzes available data according to its programming to provide enterprise users with data analysis that is consistent with the underlying business processes, technical processes, and/or the like.

Some analytics computing systems utilize relational databases to store data. Relational databases store data according to a schema, where the schema comprises multiple tables. Each table may include a number of records, where table rows correspond to records and table columns correspond to fields of the records. One or more query engines may be utilized to generate queries against the various tables in order to obtain desired data.

In some analytics computing systems, and other computing systems, however, using a relational database, however, may not be the most efficient choice. For example, relational databases can include numerous tables, which can consume significant data storage. Also, it can be challenging to develop and execute efficient queries against a relational database.

Various examples address these and other challenges utilizing a database arrangement that expresses data as predicate instances. A predicate instance expresses data using a predicate and one or more arguments, where the predicate describes a relationship between one or more arguments. The number of arguments associated with a predicate instance is referred to as the arity of the predicate instance.

Consider the example predicate instance "locatedIn (Chicago, Illinois)". In this example, the predicate type "located in" describes the relationship between the arguments "Chicago" and "Illinois" (e.g., Chicago is located in Illinois). The arity of the predicate instance "locatedIn (Chicago, Illinois)" is 2 because there are 2 arguments: "Chicago" and "Illinois." Consider another example predicate instance, "locatedIn (Germany, Europe)." This predicate instance represents an additional instance of the predicate type "is located in" with the arguments "Germany" and "Europe." The arity of the predicate instance "locatedIn (Germany, Europe)" is also 2 because there are 2 arguments, "Germany" and "Europe."

Some predicate instances of the same predicate type may have different arities. Consider the following additional example predicate instances: "hasProperty (dog, happy, smart, brown)" and "hasProperty (fish, wet)." Both predicate instances have the predicate type "hasProperty." The predicate instance "hasProperty (dog, happy, smart, brown)" has an arity of 4 while the predicate instance "hasProperty (fish, wet)" has an arity of 2.

Various example databases may use key-value data structures to encode, store, and query predicate instances data stored as or edges. A key-value data structure is a table, array, or similar data structure comprising records described by a unique key. A key-value data structure may be queried using key data to retrieve one or more records comprising value data corresponding to the key data. Dictionaries and hash tables are examples of key-value data structures.

In some examples, a database may include a node data structure, an arity data structure, a node predicate position data structure, and a position predicate data structure. The node data structure may be a key-value data structure where the key data is or is based on the name of a predicate type or argument. Records at the node data structure store value data indicating a node identifier for the corresponding predicate type or argument. The arity data structure may be a key-value data structure where the key data indicates a predicate instance and the value data indicates an arity of the corresponding predicate instance.

The node predicate position data structure may be a key-value data structure where the key data includes an argument. The value data stored by records at the node predicate position data structure may indicate a predicate instance and position associated with the corresponding argument.

The position predicate node data structure may be a key-value data structure where the key data includes predicate instance positions (e.g. for arguments) and predicate instances. The value data stored by records at the position predicate the data structure may indicate argument values associated with the corresponding predicate instances and predicate instance positions.

In some examples, a database management application may utilize the node data structure, arity data structure, node predicate position data structure, and position predicate node data structure to execute a query returning edges that contain a particular argument. For example, the database management application may utilize the node data structure to encode the argument. For example, the database management application may utilize the argument as a key value to retrieve a corresponding node identifier for the argument.

The argument node identifier may be used as key data to identify one or more records at the node predicate position data structure corresponding to the argument node identifier. If the argument is used by more than one predicate instance, there may be more than one record at the node predicate position data structure corresponding to the argument node identifier. Each record at the node predicate position data structure corresponding to the argument node identifier may indicate a predicate instance and a position where the argument appears at the predicate instance.

The database management application may utilize the predicate instances and positions retrieved from the node predicate position data structure as keys at the position predicate node data structure to reconstruct edges (e.g., predicate instances) including the argument. The constructed edges/predicate instances may be returned in response to the initial query.

It will be appreciated that other key-value data structures may be included in some example databases, for example, as described herein. For example, additional key-value data structures may facilitate the performance of additional queries, query types, and/or other operations.

In various examples, the arrangements described herein may provide certain advantages over relational databases. For example, encoding argument and predicate type data may reduce the total data storage relative to relational databases, which may store data in unencoded formats. Also, accessing the various data structures may be less computationally expensive than executing queries against the tables of a relational database. For example, accessing a record or records at a key-value data structure may be less computationally expensive than corresponding operations at a relational database.

FIG. 1 is a diagram showing one example of an environment 100 for implementing encoded data storage. The environment 100 comprises an analytics computing system 102 and a user computing device 104. The analytics computing system 102 can be configured to perform various tasks using data resources. Tasks performed by the analytics computing system 102 can include, for example, providing various reports, forecasts, responses to user queries, and/or the like based on underlying resources. An example analytics computing system 102 is the SAP® Analytics Cloud available from SAP SE of Waldorf, Germany.

In some examples, the analytics computing system 102 is implemented in an on-premise environment. For example, an enterprise utilizing the analytics computing system 102 may maintain an on-premise computing system. The analytics computing system 102 may be implemented by executing appropriate software at the on-premise computing system. Users associated with the enterprise, such as user 108, may access the analytics computing system 102 by accessing the on-premise computing system, for example, using one or more user computing devices 104. The user computing device 104 may be or include various different types of computing devices such as, for example, desktop computers, laptop computers, tablet computers, mobile computing devices, and/or the like.

In some examples, the analytics computing system 102 is implemented in a cloud environment. For example, the analytics computing system 102 may be implemented in a public cloud environment or in a private cloud environment. In a private cloud environment, the enterprise may provide applications, implement storage, and the like, to implement the analytics computing system 102 at the private cloud environment. Executables and/or other software for implementing the analytics computing system 102 at the private cloud environment may be provided, for example, by a software provider. Users of the enterprise, such as user 108, may access the analytics computing system 102 in the private cloud environment, for example, to request, configure, and/or consume the analytics reports and/or other outputs of the analytics computing system 102.

In a public cloud environment, the cloud environment is arranged into a number of tenancies implemented by a cloud service provider. The cloud service provider may provide one or more executables or other components to implement the analytics computing system 102 at the public cloud environment. The enterprise may hold one or more tenancies, allowing users of the enterprise to access one or more instances of the analytics computing system 102 at the public cloud environment to consume analytics reports, query responses, and/or other outputs of the analytics computing system 102.

The analytics computing system 102 may also execute one or more client applications, such as client application 106. Client application 106 may perform analytics-related tasks such as, for example, implementing an accounting application for managing enterprise accounting, a human resources application for managing enterprise human resources, an environmental management application for managing enterprise environmental matters, and/or the like. The user 108, in some examples, accesses the analytics computing system 102 via the client application 106.

The analytics computing system 102 and/or a client application 106 may execute a database management application 110 implementing encoded data storage. In some examples, the database management application 110 may also be executed at the user computing device 104 in addition to, or instead of, at the client application 106 and/or analytics computing system 102. For example, the database management application 110 may, in some examples, execute in a web browser at the user computing device 104 as a component of or in conjunction with a web application. Also, although the database management application 110 is described herein in the context of an analytics computing system, it will be appreciated that the database management application 110 may be used in other contexts as well.

The database management application 110 comprises executable code for implementing various functions 138 and utilizes a data store 142 to store various data structures 140 for implementing encoded data storage. The data store 142 may be implemented using the hardware of a computing device or devices executing the database management application 110. For example, the data store 142 may utilize all or part of data storage at the user computing device 104, the analytics computing system 102, and/or a computing system executing the client applications 106.

Data structures 140 comprise a node data structure 124. The node data structure 124 may relate predicate types and argument values to corresponding unique node identifiers. A maximum node data structure 126 may indicate a number of predicate types and/or argument values described by the node data structure 124. A maximum predicate instance data structure 128 may describe the number of predicate instances described at the data structures 140 for each respective predicate type.

An arities data structure 136 may indicate the corresponding arity of each predicate instance described by the data structures 140. In some examples, records at the arities data structure may comprise a field indicating predicate type, a field indicating predicate instance, and a field indicating arity. The predicate type may be described by a predicate type identifier encoded at the node data structure 124. The predicate instance may indicate a number instance of the predicate type, for example, as indicated by the maximum predicate instance data structure 128. The arity may be an integer indicating the number of arguments associated with the indicated predicate instance. In some examples, the arities data structure 136 is a key-value data structure having key data corresponding to predicate instance (e.g., predicate type indicator and instance number) and value data indicating the corresponding arity.

A node predicate position data structure 130, position node predicate data structure 132, and position predicate data structure 134 are key-value data structures comprising information about argument values at particular positions of particular predicate instances described by the data structures 140. The node predicate position data structure 130, position node predicate data structure 132, and position predicate data structure 134 may be used by the functions 138 to respond to various types of queries, for example, as described herein.

The node predicate position data structure 130 may be arranged with key data being a node indicator of an argument value. The node indicator of the argument value may be associated with an argument value at the node data structure 124. The value data of the node predicate position data structure 130 may indicate a predicate instance and a position. In this way, the node predicate position data structure may be queried with a node indicator of the argument value. Records corresponding to the node indicator described predicate instances including the argument described by the node indicator of the argument value and a predicate position of the argument. Because a single argument value may be used in multiple different predicate instances, there may be more than one record at the node predicate position data structure corresponding to a particular node indicator of an argument value.

The position node predicate data structure 132 may be arranged with key data including a predicate position and node indicator of an argument value. The value data may indicate a predicate instance. In this way, the position node predicate data structure 132 may be queried with a predicate position and a node indicator of an argument value. A record corresponding to a given combination of predicate position and argument (e.g., node indicator thereof) may return predicate instances that have the corresponding argument value at the predicate position.

The position predicate data structure 134 may be arranged with key data indicating predicate position and predicate instance. The value data may be a node indicator of an argument value. In this way, the position predicate data structure 134 may be queried with a predicate position and a predicate instance. A record corresponding to a given combination of predicate position and predicate instance may describe a node indicator of an argument value at the predicate position of that predicate instance.

The functions 138 may comprise a constructor function 112, a predicate instance decoder function 114, a factoid query function 116, a unification query function 118, a confirmation query function 120, and a variable query edge matrix function 122.

The constructor function 112 is configured to add predicate instance data to the various data structures 140. This may include, for example, adding records to the various data structures 140 so that the data structures 140 described and added predicate instance. The predicate instance decoder function 114 is configured to decode the various data structures 140 to extract predicate instances that have been previously encoded.

A factoid query function 116 executes factoid queries against the data structures 140. A factoid query is a query including an indication of a predicate instance in which at least one value is a variable. The value that is a variable may be an indication of the predicate type and/or one or more arguments of the predicate instance. The factoid query function 116 may return an indication of possible values for each of the variables. A unification query function 118 executes unification queries against the data structures 140. A unification query is a query including an indication of whether a predicate instance comprising the same value for one or more predicate instance arguments is true. For example, for example, in a unification query defining the same variable multiple times, all instances of the variable in the query should have the same value.

A confirmation query function 120 executes confirmation queries against the data structures 140. For example, the confirmation query function 120 may receive as input a predicate instance with all values present. For example, the received predicate instance may indicate a predicate type and argument values for arguments of the predicate type up to and arity of the predicate instance. The confirmation query function 120 may determine, based on the data structures 140, whether the input predicate instance is true or false.

A node neighbor function 120 to executes node neighbor queries against the data structures 140. A node neighbor query may receive as input an indication of a predicate type and/or argument value. The node neighbor function 120 may return predicate instances described by the data structures 140 that include the input predicate type and/or argument value.

Figure 2:
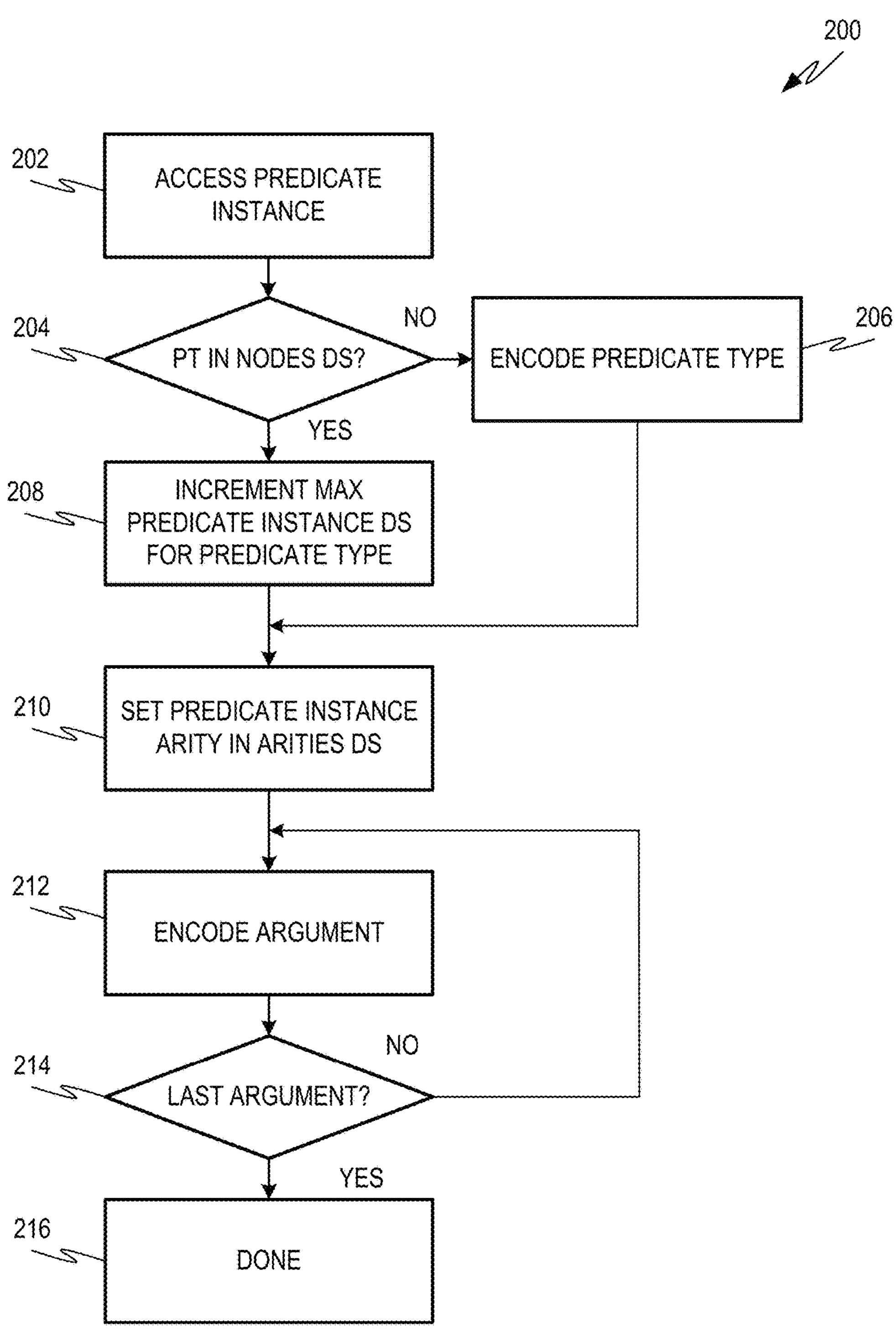
FIG. 2 is a flowchart showing one example of a process flow that may be executed by the database management application of FIG. 1 to encode a predicate instance.

FIG. 2 is a flowchart showing one example of a process flow 200 that may be executed by the database management application 110 (e.g. the constructor function 112 thereof) to encode a predicate instance to the data structures 140 of FIG. 1. At operation 202, the database management application 110 may access a predicate instance to be encoded to the data structures 140. The predicate instance may describe a predicate type and at least one argument.

At operation 204, the database management application 110 may determine if the predicate type indicated by the predicate instance is already encoded at the node data structure 124. This may include determining if any records at the node data structure 124 describe a node identifier for the predicate type. If the predicate type is not already encoded at the node data structure 124, the database management application 110 may encode the predicate type at operation 206. This may include, for example, writing a node record to the node data structure. The node record may have a field corresponding to the predicate type and a field indicating a node identifier for the predicate type. In some examples, encoding the predicate type also includes writing a maximum predicate instance record for the predicate type at the maximum predicate instance data structure 128. Records at the maximum predicate instance data structure 128 may include a field indicating the node identifier of a predicate type and a field indicating a number of instances of the predicate type. Accordingly, a maximum predicate instance record for the predicate type of the predicate instance may include a field indicating the node identifier for the predicate type and a field indicating the number of instances at the predicate type that have been encoded to the data structures 140, which may be 1 if operation 206 is executed.

If the predicate type is already encoded at the node data structure 124, the database management application 110 may increment a record corresponding to the predicate type at the maximum predicate instance data structure 128. This may include identifying the maximum predicate instance record at the maximum predicate instance data structure 128 corresponding to the predicate type. The field of the maximum predicate instance record indicating the number of instances of the predicate type may be incremented.

At operation 210, the database management application 110 may set a predicate instance arity for the predicate instance at the arities data structure 136. This may include writing a new arity record for the predicate instance to the arities data structure 136. The arities record may comprise one or more fields indicating the predicate instance and a field indicating the arity of the predicate instance. In some examples, the predicate instance is indicated in the arity record using two values: the node identifier of the predicate type and a number of the predicate instance. For example, if the predicate instance is the third encoded predicate instance the number of the predicate instance may be 3.

At operation 212, the database management application 110 may encode the argument at the first predicate instance position of the predicate instance. This may include writing data about the argument to the data structures 140. An example way of encoding a predicate instance argument is provided herein with respect to FIG. 3. At operation 214, the database management application 110 may determine if the current argument considered at operation 212 was the last argument of the predicate instance. If the current argument is not the last argument of the predicate instance, the database management application 110 may move to the argument at the next predicate instance position and encode that argument at operation 212. When the last argument of the predicate instance is considered, the database management application 110 may complete encoding of the predicate instance at operation 216.

Figure 3:
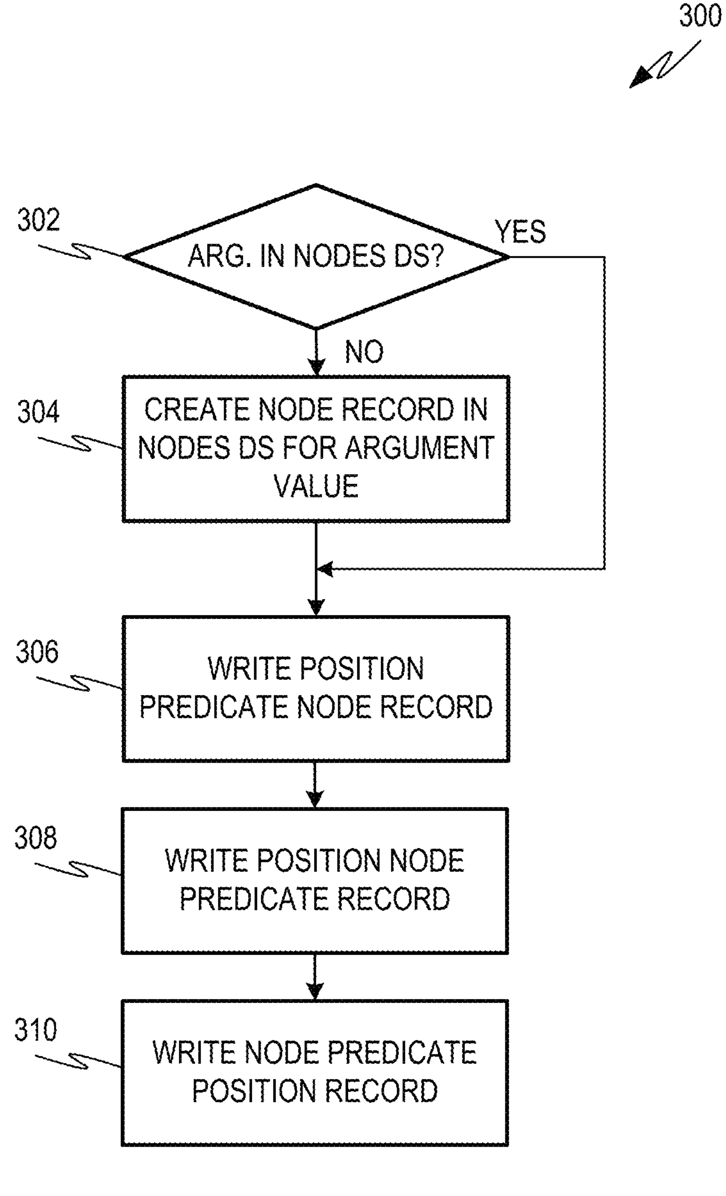
FIG. 3 is a flowchart showing one example of a process flow that may be executed by the database management application of FIG. 1 to encode an argument of a predicate instance.

FIG. 3 is a flowchart showing one example of a process flow 300 that may be executed by the database management application 110 (e.g. the constructor function 112 thereof) to encode an argument of a predicate instance to the data structures 140. The process flow 300 illustrates one example way of performing the operation 212 of the process flow 200. An argument considered by the process flow 300 may be described by a predicate instance (e.g., predicate type and predicate instance number), a predicate instance position, and an argument value.

At operation 302, the database management application 110 determines if the argument value has been encoded at the nodes data structure 124. This may include determining if the nodes data structure 124 includes a record indicating the argument value. If the nodes data structure 124 does include a record indicating the argument value, the database management application 110 may read that record and determine the node identifier for the argument value. If the nodes data structure does not include a record indicating the argument value, the database management application 110 may create a node record for the argument value at operation 304.

At operation 306, the database management application 110 may write a position predicate record for the argument to the position predicate no data structure 134. The position predicate record may include fields indicating the predicate instance position of the argument, the predicate instance (e.g., the node identifier of the predicate type and predicate instance number) and the node identifier for the argument value. The predicate instance position and predicate instance may be key data for the position predicate record and the node indicator of the argument value may be the value data for the position predicate record.

At operation 308, the database management application 110 may write a position node predicate record for the argument to the position node predicate data structure 132. The position node predicate record may include fields indicating the predicate instance position, the node identifier of the argument value, and the predicate instance (e.g., the node identifier of the predicate type and predicate instance number). The predicate instance position and node identifier for the argument value may be key data for the position node predicate record, with the predicate instance being the value data.

At operation 310, the database management application 110 may write a node predicate position record for the argument to the node predicate position data structure 130. The node predicate position record may include fields indicating the node identifier of the argument value, the predicate instance (e.g., the node identifier of the predicate type and predicate instance number), and the predicate instance position. The node identifier for the argument value may be the key data for the node predicate position record. The predicate instance and predicate instance position may be the value data.

TABLES 1-7 below show example data structures 140 encoding the example predicate instances indicated by Code Fragment [1] according to the example process flows 200 and 300:

```
locatedIn (munich, Germany)
locatedIn(venice,veneto)
locatedIn(venice,Italy)
hasProperty (car, red)
hasProperty (house, red roof, fireplace)
```

TABLE 1 shows an example node data structure 124 encoding the example predicate instances indicated by Code Fragment [1]:

TABLE 1

| NODE DATA STRUCTURE | |
|---|---|
| Node Value | Node Identifier |
| locatedIn | 0 |
| Munich | 1 |
| Germany | 2 |
| Venice | 3 |
| Veneto | 4 |
| Italy | 5 |
| hasProperty | 6 |
| Car | 7 |
| Red | 8 |
| House | 9 |
| Roof | 10 |
| Fireplace | 11 |

TABLE 2 shows an example arities data structure 136 encoding the example predicate instances indicated by Code Fragment [2]:

TABLE 2

| ARITIES DATA STRUCTURE | | |
|---|---|---|
| Predicate Type | Predicate Instance | Arity |
| 0 | 1 | 2 |
| 0 | 2 | 2 |
| 0 | 3 | 2 |
| 6 | 1 | 2 |
| 6 | 2 | 3 |

TABLE 3 shows an example maximum predicate instance data structure 128 encoding the example predicate instances indicated by Code Fragment [2]:

TABLE 3

| MAXIMUM PREDICATE INSTANCE DATA STRUCTURE | |
|---|---|
| Predicate Type | Number of Instances |
| 0 | 3 |
| 6 | 2 |

TABLE 4 shows an example position predicate data node structure 134 encoding the example predicate instances indicated by Code Fragment [2]:

TABLE 4

| POSITION PREDICATE NODE | | | |
|---|---|---|---|
| Predicate Position | Predicate Type | Predicate Instance | Argument Node Identifier |
| 0 | 0 | 0 | 1 |
| 1 | 0 | 0 | 2 |
| 0 | 0 | 1 | 3 |
| 1 | 0 | 1 | 4 |
| 0 | 0 | 2 | 3 |
| 1 | 0 | 2 | 5 |
| 0 | 6 | 1 | 7 |
| 1 | 6 | 1 | 8 |
| 0 | 6 | 2 | 9 |

TABLE 4-continued

| POSITION PREDICATE NODE | | | |
|---|---|---|---|
| Predicate Position | Predicate Type | Predicate Instance | Argument Node Identifier |
| 1 | 6 | 2 | 10 |
| 2 | 6 | 2 | 11 |

TABLE 5 shows an example position node predicate data structure 132 encoding the example predicate instances indicated by Code Fragment [2]:

TABLE 5

| POSITION NODE PREDICATE | | | |
|---|---|---|---|
| Predicate Position | Argument Node Identifier | Predicate Type | Predicate Instance |
| 0 | 1 | 0 | 0 |
| 1 | 2 | 0 | 0 |
| 0 | 3 | 0 | 1 |
| 1 | 4 | 0 | 1 |
| 0 | 3 | 0 | 2 |
| 1 | 5 | 0 | 2 |
| 0 | 7 | 6 | 1 |
| 1 | 8 | 6 | 1 |
| 0 | 9 | 6 | 2 |
| 1 | 10 | 6 | 2 |
| 2 | 11 | 6 | 2 |

TABLE 6 shows an example position node predicate data structure 132 encoding the example predicate instances indicated by Code Fragment [2]:

TABLE 6

| NODE PREDICATE POSITION | | | |
|---|---|---|---|
| Argument Node Identifier | Predicate Type | Predicate Instance | Predicate Position |
| 1 | 0 | 0 | 0 |
| 2 | 0 | 0 | 1 |
| 3 | 0 | 1 | 0 |
| 4 | 0 | 1 | 1 |
| 3 | 0 | 2 | 0 |
| 5 | 0 | 2 | 1 |
| 7 | 6 | 1 | 0 |
| 8 | 6 | 1 | 1 |
| 9 | 6 | 2 | 0 |
| 10 | 6 | 2 | 1 |
| 11 | 6 | 2 | 2 |

Figure 4:
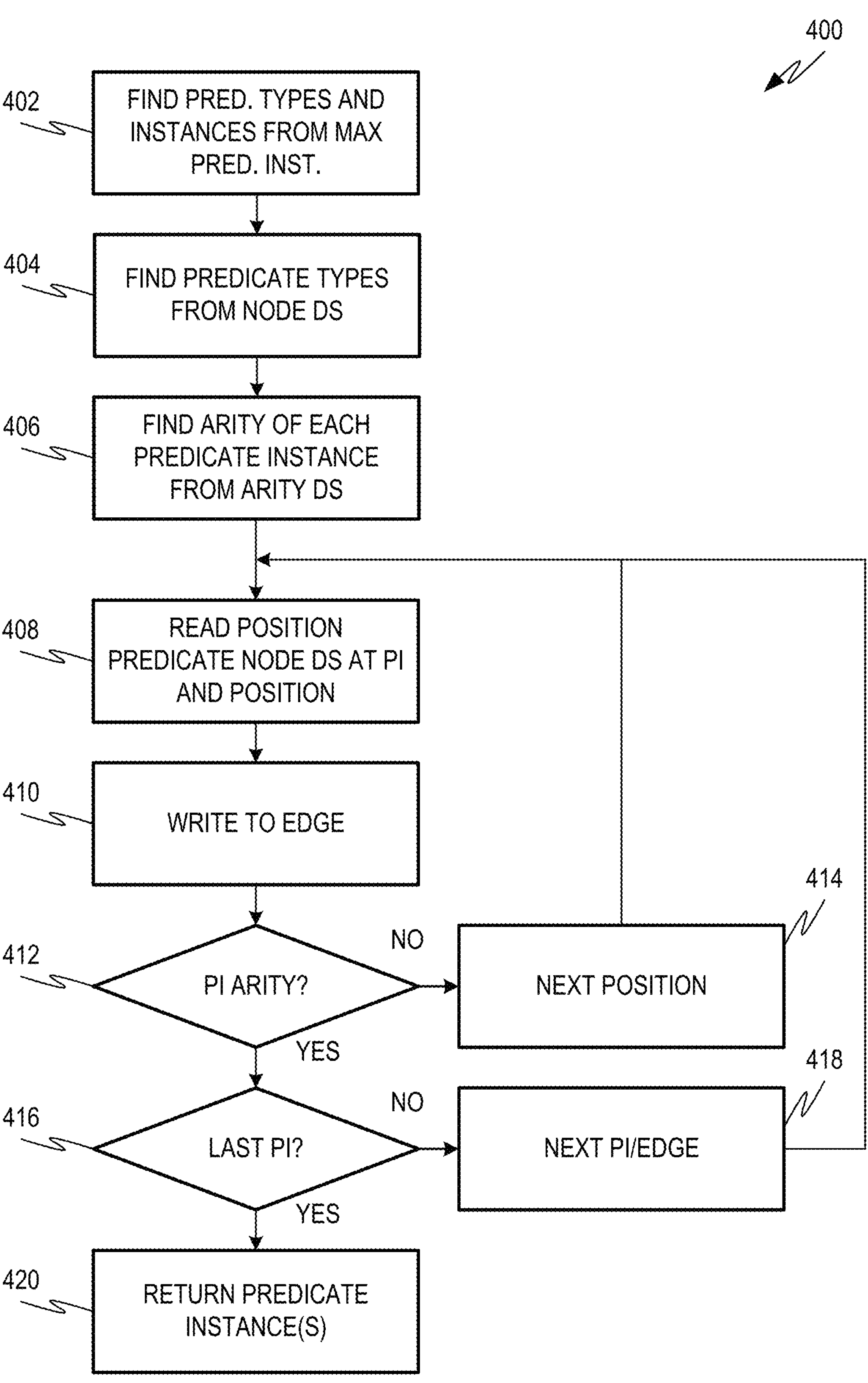
FIG. 4 is a flowchart showing one example of a process flow that may be executed by the database management application of FIG. 1 to decode predicate instances encoded to the data structures of FIG. 1.

FIG. 4 is a flowchart showing one example of a process flow 400 that may be executed by the database management application 110 (e.g., the predicate instance decoder function 114) to decode predicate instances encoded to the data structures 140 of FIG. 1. For example, the process flow 400 may be executed to retrieve all of the predicate instances that have been encoded in the data structures 140.

At operation 402, the database management application 110 may determine each predicate type encoded at the data structures 140 and the number of instances of each respective data type from the maximum predicate instance data structure 128. For example, the database management application 110 may read each record of the maximum predicate instance data structure 128. Each record may indicate, for one predicate type, the node indicator of the predicate type and a number of instances of the predicate type.

At operation 404, the database management application 110 may use the node data structure 124 to identify predicate type names for each predicate type identified at operation 402. In some examples, the database management application 110 may initiate an array that will be later populated with predicate instance arguments and returned. The predicate type names may be written to the array. At operation 406, the database management application 110 may use the arities data structure 136 to determine the arity of each predicate instance identified at operation 404.

At operation 408, the database management application 110 may read the position predicate node data structure 134 using a predicate instance and predicate instance position as key. This may yield a position predicate record indicating the node identifier of the argument value at the given predicate instance and predicate instance position. Initially, a first predicate instance of the predicate instances identified at operation 402, and a first position of the first predicate instance may be used. The node identifier may be used to identify the argument value, which may be written to the array in association with the corresponding predicate instance.

At operation 412, the database management application 110 determines if each predicate position of the considered predicate instance has been considered, up to the arity of the predicate instance. If additional predicate positions are to be considered, the database management application 110 may increment to the next predicate instance position at operation 414 and return to operation 408 to read the position predicate data structure at the predicate instance and the new predicate instance position. If all predicate instance positions of the currently considered predicate instance have been considered at operation 412, then the database management application 110 may determine if all predicate instances identified at operation 402 have been considered. If additional predicate instances remained to be considered, the database management application 110 may increment to the next predicate instance at operation 418 and return to operation 408 to read the position predicate data structure at the new predicate instance (e.g. at the first predicate instance position). If all predicate instances have been considered at operation 416, the database management application may return the array, or other similar data structure, which may include representations of the identified predicate instances.

Figure 5:
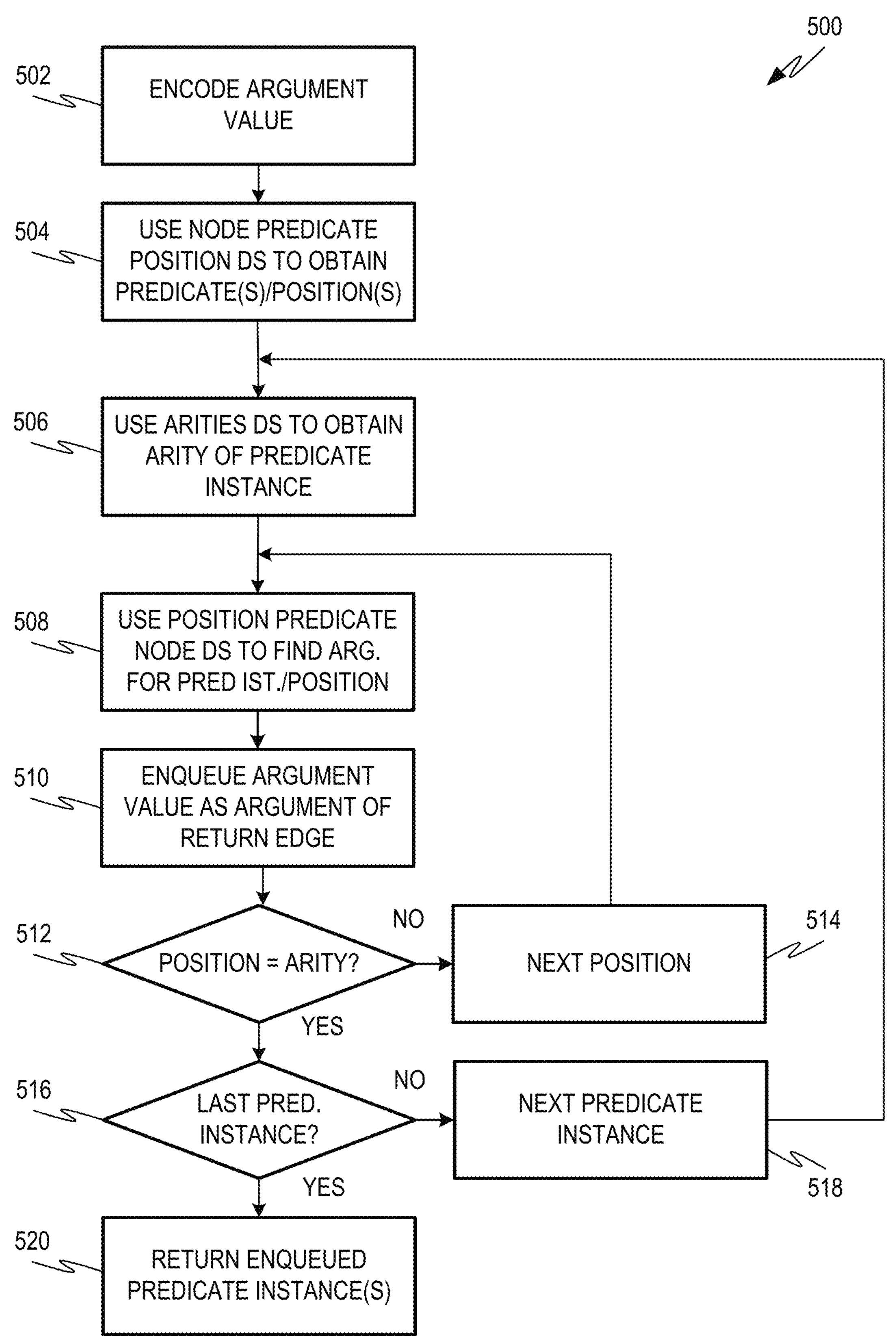
FIG. 5 is a flowchart showing one example of a process flow that may be executed by the database management application of FIG. 1 to execute a node neighbor query using the data structures of FIG. 1 where the query does not specify a predicate type.

FIG. 5 is a flowchart showing one example of a process flow 500 that may be executed by the database management application 110 (e.g., the node neighbor function 122) to execute a node neighbor query using the data structures 140 of FIG. 1. A node neighbor query may comprise an indication of a node from the node data structure 124 (e.g., an argument value or a predicate type). The node neighbor query returns an indication of all predicate instances that include the indicated argument value or predicate type. The example of FIG. 5 demonstrates the execution of a node neighbor query where the query specifies an argument value.

At operation 502, the database management application 110 encodes the argument value. This may include, for example, identifying a node record at the node data structure 124 corresponding to the argument value. The node record may include a node identifier corresponding to the argument value. At operation 504, the database management application 110 may use the node predicate position data structure 130 to obtain predicate instances and predicate instance positions that reference the node identifier of the argument value. For example, the node indicator of the argument value may be used as key data to identify one or more node predicate position records. Each identified node predicate position record may indicate a predicate instance using the argument value and a predicate instance position where the argument value is used.

At operation 506, the database management application 110 may use the arities data structure 136 to determine the arity of a first predicate instance identified at operation 504. In some examples, the database management application 110 may determine the arities of all predicate instances identified at operation 504 at the same time.

At operation 508, the database management application 110 may use the position predicate node data structure 134 to find an argument value for a first predicate instance identified at operation 504 and a first position of the predicate instance. For example, the database management application 110 may use the predicate instance position and predicate instance to identify a predicate position node record indicating a corresponding node identifier of an argument. The database management application 110 may, in some examples, decode the node indicator of the argument value to obtain the argument value.

At operation 510, the database management application may enqueue the argument value (or node indicator thereof). This may include storing the argument value in association with a predicate type of the considered predicate instance and the predicate instance position. At operation 512, the database management application 110 may determine if the currently considered predicate instance position is the last predicate instance position of the currently considered predicate instance, up to the arity of the currently considered predicate instance. If the currently considered predicate instance position is not the last predicate instance position of the currently considered predicate instance, then the database management application 110 may move to the next predicate instance position at operation 514 and return to operation 508.

If the currently considered predicate instance position is the last predicate instance position of the currently considered predicate instance, then the database management application 110 may determine, at operation 516, if the currently considered predicate instance is the last predicate instance identified at operation 504. If not, the database management application 110 may move to the next predicate instance at operation 518 and return to operation 506. If the currently considered predicate instance is the last predicate instance identified at operation 504, then the database management application 110 may return the enqueued predicate instances at operation 520.

Figure 6:
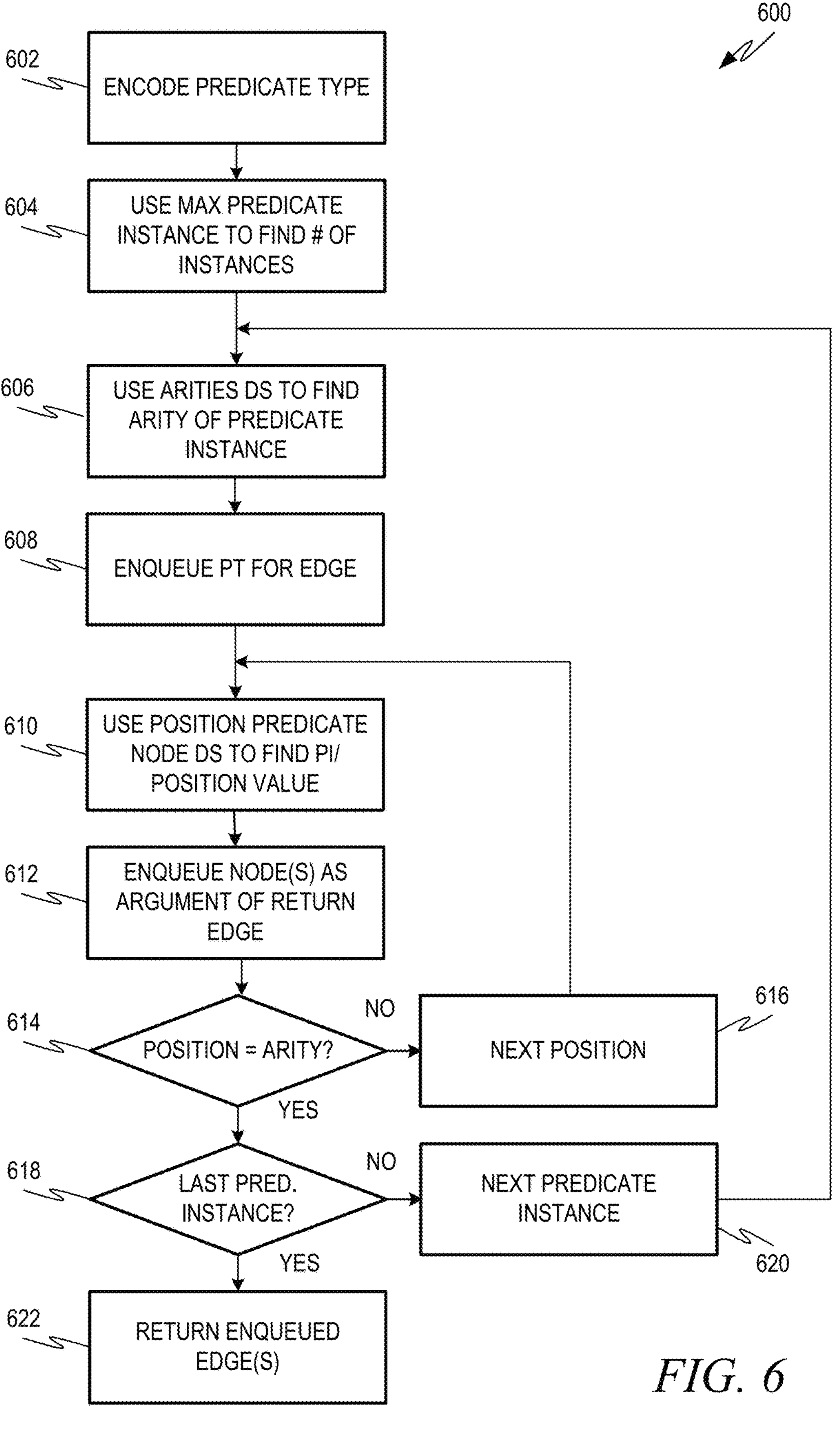
FIG. 6 is a flowchart showing one example of a process flow that may be executed by the database management application of FIG. 1 to execute a node neighbor query using the data structures of FIG. 1 where the query specifies a predicate type.

FIG. 6 is a flowchart showing one example of a process flow 600 that may be executed by the database management application 110 (e.g., the node neighbor function 122) to execute a node neighbor query using the data structures 140 of FIG. 1. The example of FIG. 6 demonstrates the execution of a node neighbor query where the query specifies a predicate type.

At operation 602, the database management application 110 encodes the predicate type. This may include, for example, identifying a node record at the node data structure 124 corresponding to the predicate type. The node record may include a node identifier corresponding to the predicate type. At operation 604, the database management application 110 may use the maximum predicate instance data structure 128 to find a number of instances of the predicate type encoded at the data structures 140.

At operation 606, the database management application 110 may use the arities data structure 136 to determine the arity of a first predicate instance of the number of predicate instances identified at operation 604. At operation 608, the database management application 110 may enqueue an indication of the considered predicate type, for example, at a memory or other data storage. The enqueued indication of the considered predicate type may be populated, as described herein, and returned in response to the query.

At operation 610, the database management application 110 may use the position predicate node data structure 134 to find an argument value for a first predicate instance identified at operation 604 and a first position of the predicate instance. For example, the database management application 110 may use the predicate instance position and predicate instance to identify a predicate position node record indicating a corresponding node identifier of an argument. The database management application 110 may, in some examples, decode the node indicator of the argument value to obtain the argument value.

At operation 612, the database management application may enqueue the argument value (or node indicator thereof). This may include storing the argument value in association with a predicate type of the considered predicate instance enqueued at operation 608 and the considered predicate instance position. At operation 614, the database management application 110 may determine if the currently considered predicate instance position is the last predicate instance position of the currently considered predicate instance, up to the arity of the currently considered predicate instance. If the currently considered predicate instance position is not the last predicate instance position of the currently considered predicate instance, then the database management application 110 may move to the next predicate instance position at operation 616 and return to operation 610.

If the currently considered predicate instance position is the last predicate instance position of the currently considered predicate instance, then the database management application 110 may determine, at operation 618, if the currently considered predicate instance is the last predicate instance of the predicate type. If not, the database management application 110 may move to the next predicate instance at operation 620 and return to operation 606. If the currently considered predicate instance is the last predicate instance of the predicate type, then the database management application 110 may return the enqueued predicate instances at operation 620.

Figure 7:
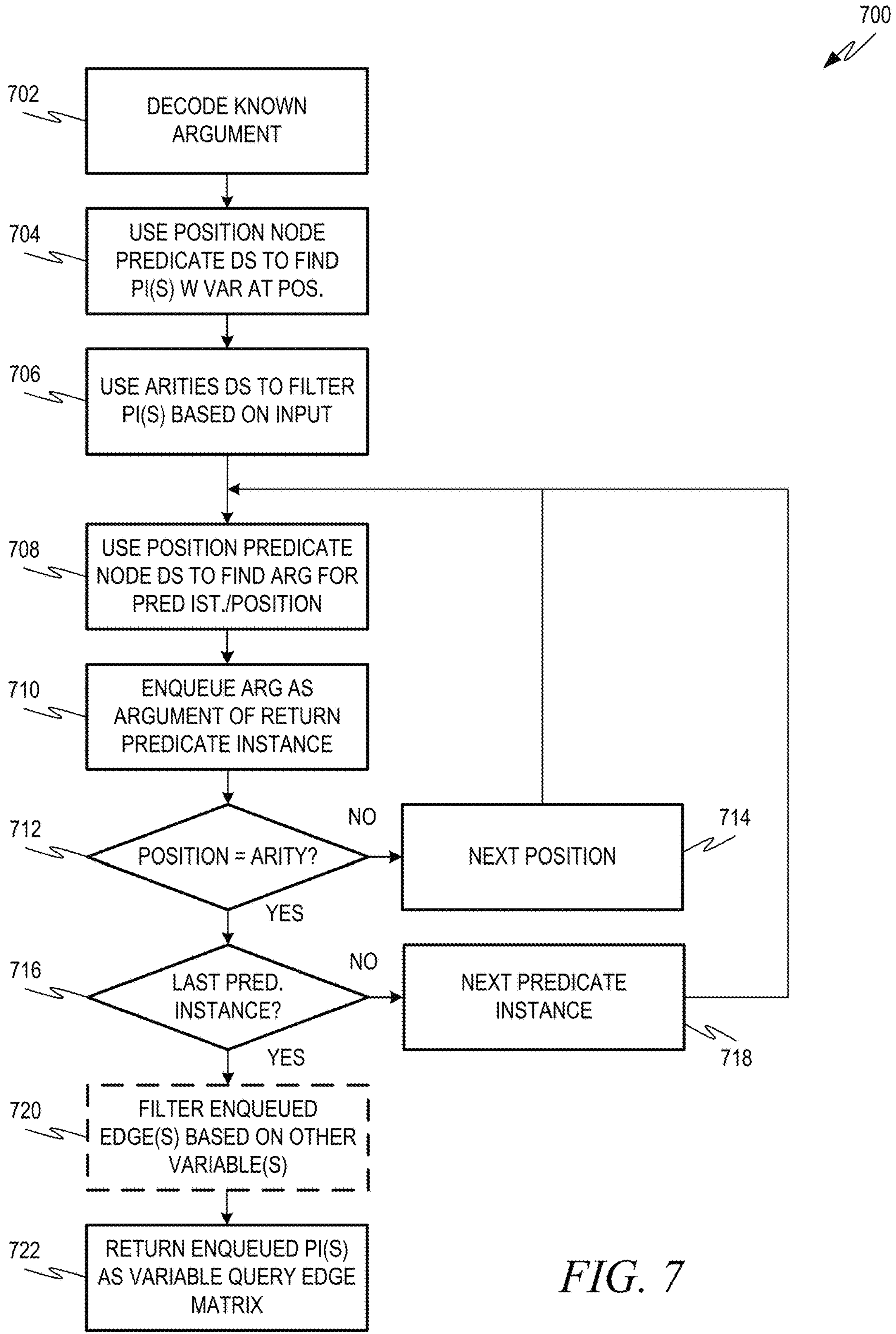
FIG. 7 is a flowchart showing one example of a process flow that may be executed by the database management application of FIG. 1 to build a variable query edge matrix where the predicate type of the input predicate instance is unknown.

FIG. 7 is a flowchart showing one example of a process flow 700 that may be executed by the database management application 110 to build a variable query edge matrix. The variable query edge matrix may be used to respond to unification queries, confirmation queries, and factoid queries, as described herein with respect to FIGS. 9-11. The variable query edge matrix may be built from an input predicate instance including one or more variables. For example, the input predicate instance may include a predicate type and one or more argument values. In some examples, the predicate type and/or one or more of the argument values may be provided as variables. FIG. 7 shows an example for building a variable edge query matrix where the predicate type of the input predicate instance is unknown.

At operation 702, the database management application 110 may decode a first known argument of the predicate instance. This may include, for example, determining the node identifier associated with the known argument value, as described herein. At operation 704, the database management application 110 may use the position node predicate data structure 132 to find predicate instances described by the data structures 140 that have the known argument at the same predicate instance position, for example, as described herein. The predicate instance position of the known argument may also be known from the input predicate instance.

At operation 706, the database management application 110 may use the arities data structure 136 to determine the arities of the predicate instances identified at operation 704 and filter the identified predicate instances based on the known arity of the input predicate instance. For example, predicate instances identified at operation 704 having an arity different than the arity of the input predicate instance may be filtered and, for example, not further considered.

At operation 708, the database management application 110 may use the position predicate data structure 134 to find an argument value for a considered predicate instance at a first predicate instance position, for example, as described herein. At operation 710, the database management application 110 may enqueue the argument determined at operation 708 as a corresponding argument of a return predicate instance at the considered predicate instance position.

At operation 712, the database management application 110 may determine if the currently considered predicate instance position is the last predicate instance position of the currently considered predicate instance, up to the arity of the currently considered predicate instance. If the currently considered predicate instance position is not the last predicate instance position of the currently considered predicate instance, then the database management application 110 may move to the next predicate instance position at operation 714 and return to operation 708.

If the currently considered predicate instance position is the last predicate instance position of the currently considered predicate instance, then the database management application 110 may determine, at operation 716, if the currently considered predicate instance is the last predicate instance of the predicate type. If not, the database management application 110 may move to the next predicate instance at operation 718 and return to operation 708.

If the currently considered predicate instance is the last predicate instance of the predicate type, then the enqueued data may include representations of one or more predicate instances encoded at the data structures 140 that include the known argument from the input predicate instance. At optional operation 720, the database management application 110 may filter the enqueued data to remove predicate instances that are inconsistent with the input predicate instance. For example, the input predicate instance may have additional known arguments other than the known argument considered at operation 702. Some of the enqueued predicate instances may include predicate types and/or arguments that are inconsistent with these additional arguments. Such predicate instances may be filtered. At operation 722, the enqueued predicate instances may be returned as the variable query edge matrix.

Figure 8:
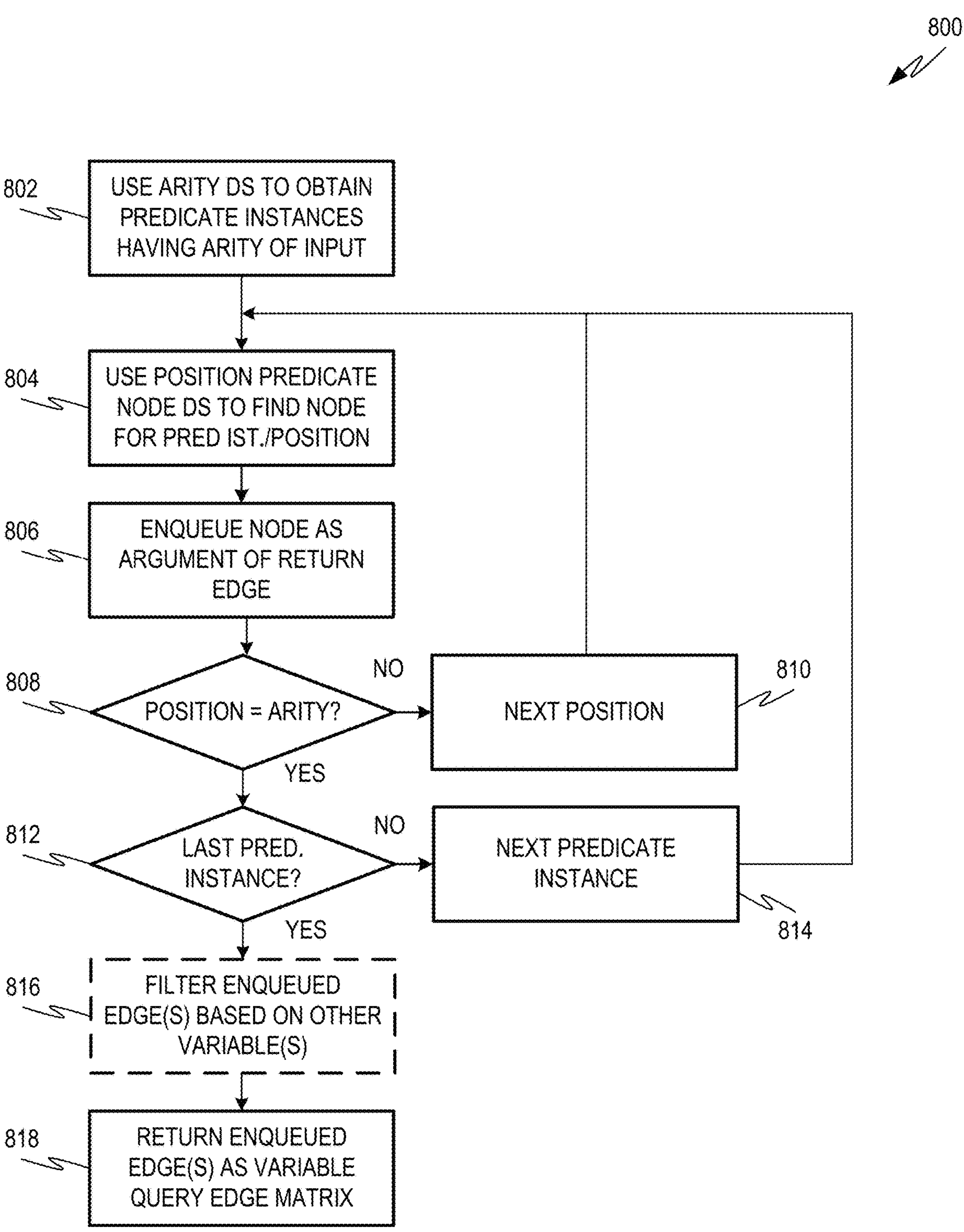
FIG. 8 is a flowchart showing one example of a process flow that may be executed by the database management application of FIG. 1 to build a variable query edge matrix when the predicate type of the input predicate instance is known.

FIG. 8 is a flowchart showing one example of a process flow 800 that may be executed by the database management application 110 to build a variable query edge matrix when the predicate type of the input predicate instance is known. At operation 802, the database management application may use the arities data structure 136 to obtain indications of predicate instances of the known predicate type that have the known arity of the input predicate instance. This may include, for example, using the maximum predicate instance data structure 128 to determine the number of predicate instances of the known predicate type that are encoded at the data structures 140. The database management application 110 may then find the arity of each identified predicate instance using the arities data structure 136. In some examples, predicate instances having arities different than the arity of the input predicate instance may be filtered and, for example, considered no further.

At operation 804, the database management application 110 may use the position predicate data structure 134 to find an argument value for a considered predicate instance at a first predicate instance position, for example, as described herein. At operation 806, the database management application 110 may enqueue the argument determined at operation 804 as a corresponding argument of a return predicate instance at the considered predicate instance position.

At operation 808, the database management application 110 may determine if the currently considered predicate instance position is the last predicate instance position of the currently considered predicate instance, up to the arity of the currently considered predicate instance. If the currently considered predicate instance position is not the last predicate instance position of the currently considered predicate instance, then the database management application 110 may move to the next predicate instance position at operation 810 and return to operation 804.

If the currently considered predicate instance position is the last predicate instance position of the currently considered predicate instance, then the database management application 110 may determine, at operation 812, if the currently considered predicate instance is the last predicate instance of the predicate type. If not, the database management application 110 may move to the next predicate instance at operation 814 and return to operation 804.

If the currently considered predicate instance is the last predicate instance of the predicate type, then the enqueued data may include representations of one or more predicate instances encoded at the data structures 140 that have the same predicate type and arity as the known input predicate instance. At optional operation 816, the database management application 110 may filter the enqueued data to remove predicate instances that are inconsistent with the input predicate instance. For example, enqueued predicate instances having argument values inconsistent with the input predicate instance may be filtered. At operation 818, the enqueued predicate instances may be returned as the variable query edge matrix.

Figure 9:
FIG. 9 is a flowchart showing one example of a process flow that may be executed by the database management application of FIG. 1 to respond to a factoid query.
Figure 9:
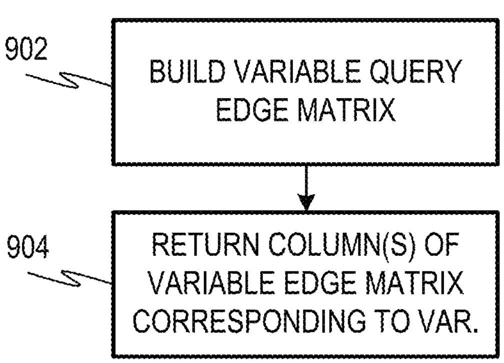

FIG. 9 is a flowchart showing one example of a process flow 900 that may be executed by the database management application 110 (e.g., the factoid query function 116 thereof) to respond to a factoid query. A factoid query may include an input predicate instance where one or more of the arguments and/or the predicate type are unknown or listed as variables. At operation 902, the database management application 110 may build a variable query edge matrix using the input predicate instance. If the input predicate instance specifies a predicate type, the variable query edge matrix may be determined using the process flow 800 of FIG. 8. If the input predicate instance does not specify a predicate type, the variable query edge matrix may be determined using the process flow 700 of FIG. 7.

At operation 904, the database management application 110 may return columns of the variable edge matrix that correspond to unknown predicate types and/or argument values in the input predicate instance. Accordingly, the factoid query may return possible values for the unknown predicate type and/or argument values indicated by the input predicate instance.

Figure 10:
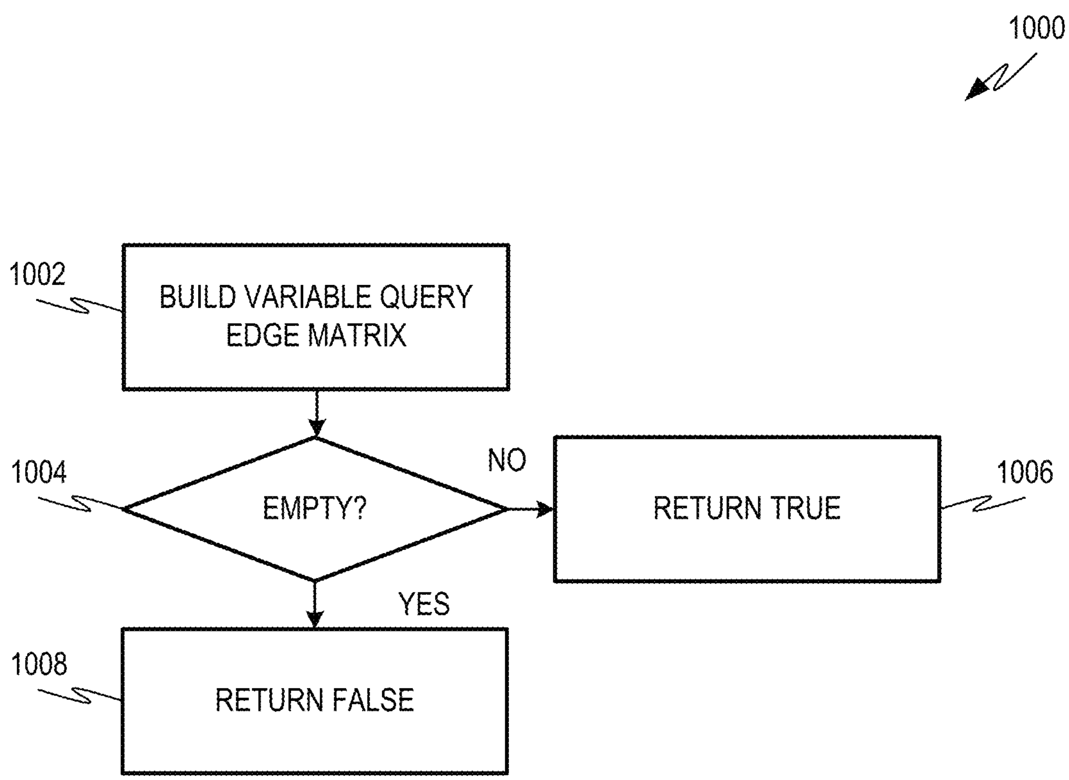
FIG. 10 is a flowchart showing one example of a process flow that may be executed by the database management application of FIG. 1 to respond to a confirmation query.

FIG. 10 is a flowchart showing one example of a process flow 1000 that may be executed by the database management application 110 (e.g. the confirmation query function 120 thereof) to respond to a confirmation query. A confirmation query may include an input predicate instance where all values are specified. At operation 1002, the database management application 110 may build a variable query edge matrix using the input predicate instance. For example, the variable query edge matrix may be determined using the process flow 800 of FIG. 8. At operation 1004, the database management application 110 determines if the variable query edge matrix is empty. If the variable query edge matrix is empty, it may indicate that no predicate instances encoded by the data structures 140 are consistent with the input predicate instance. Accordingly, if the variable query edge matrix is empty, the database management application 110 may return false at operation 1008. This may indicate that the input predicate instance is false with respect to the predicate instances stored at the data structures 140. On the other hand, if the variable query edge matrix is not empty, it may indicate that the input predicate instance is true (e.g., the variable query edge matrix comprises one or more predicate instances encoded by the data structures 140 that are consistent with the input predicate instance). Accordingly, the database management application 110 may return true at operation 1006.

Figure 11:
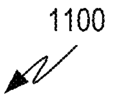
FIG. 11 is a flowchart showing one example of a process flow that may be executed by the database management application of FIG. 1 to respond to a unification query.
Figure 11:
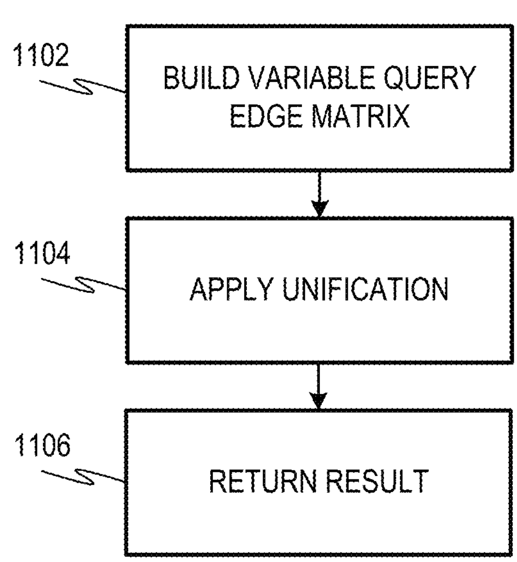

FIG. 11 is a flowchart showing one example of a process flow 1100 that may be executed by the database management application 110 (e.g. the unification query function 118 thereof) to respond to a unification query. A unification query may include an input predicate instance having at least two arguments represented by the same variable. The unification query may be true if at least one predicate instance encoded by the data structures 140 has equivalent arguments at the predicate instance positions indicated by the input predicate instance.

At operation 1102, the database management application 110 may build a variable query edge matrix based on the input predicate instance. If the input predicate instance specifies a predicate type, the variable query edge matrix may be determined using the process flow 800 of FIG. 8. If the input predicate instance does not specify a predicate type, the variable query edge matrix may be determined using the process flow 700 of FIG. 7. At operation 1104, the database management application 110 may apply unification to the variable query edge matrix. This may include determining if any of the predicate instances indicated by the variable query edge matrix have equivalent arguments, as indicated by the input predicate instance. At operation 1106, the database management application 110 may return a result to the unification query function 118. In some examples, the result may indicate that the unification is either true or false.

In view of the disclosure above, various examples are set forth below. It should be noted that one or more features of an example, taken in isolation or combination, should be considered within the disclosure of this application.

EXAMPLES

Example 1 is a computing system for storing data, the computing system comprising: at least one processor programmed to perform operations comprising: accessing argument data describing a first argument value; accessing a first record from a node data structure using the first argument value, the first record from the node data structure describing a first argument identifier; accessing a first node predicate position record from a node predicate position data structure using the first argument identifier, the first node predicate position record comprising a first predicate instance identifier and an indication of a first predicate instance position of a first predicate instance associated with the first predicate instance identifier; accessing a first position predicate node record from a position predicate node data structure using the first predicate instance identifier and a second position identifier describing a second predicate instance position of the first predicate instance, the first position predicate node record indicating a second argument identifier; and returning, in response to the argument data, first predicate instance data describing the first predicate instance, the first argument value at the first predicate instance position of the first predicate instance, and a second argument value associated with the second argument identifier at the second predicate instance position of the first predicate instance.

In Example 2, the subject matter of Example 1 optionally includes the operations further comprising accessing a first arity record from an arity data structure using the first predicate instance identifier, the first arity record describing an arity of the first predicate instance associated with the first predicate instance identifier, the first predicate instance data comprising a number of arguments equivalent to the arity.

In Example 3, the subject matter of any one or more of Examples 1-2 optionally include the operations further comprising: accessing a second node predicate position record from a node predicate position data structure using the first argument identifier, the second node predicate position record comprising a second predicate instance identifier and an indication of a first predicate instance position of a second predicate instance associated with the second predicate instance identifier; accessing a second position predicate node record from the position predicate node data structure using the second predicate instance identifier and a second position identifier describing a second predicate instance position of the second predicate instance, the second position predicate node record indicating a third argument identifier; and returning, in response to the argument data, second predicate instance data describing the second predicate instance, the first argument value at the first predicate instance position of the second predicate instance, and a third argument value associated with the third argument identifier at the second predicate instance position of the second predicate instance.

In Example 4, the subject matter of any one or more of Examples 1-3 optionally include the operations further comprising: accessing predicate type data describing a first predicate type; accessing a second node record from the node data structure using the first predicate type, the second node record describing a first predicate type identifier; accessing a second position predicate node record from the position predicate node data structure using a second predicate instance indicator describing a second predicate instance of the first predicate type and an indication of a first predicate instance position of the second predicate instance, the second position predicate node record indicating a third argument identifier; and returning, in response to the predicate type data, second predicate instance data describing the second predicate instance and a third argument value associated with the third argument identifier at the first predicate instance position of the second predicate instance.

In Example 5, the subject matter of Example 4 optionally includes the operations further comprising accessing a first arity record from an arity data structure using the second predicate instance indicator, the first arity record describing an arity of the second predicate instance, and the second predicate instance data describing a number of arguments corresponding to the arity of the second predicate instance.

In Example 6, the subject matter of any one or more of Examples 4-5 optionally include the operations further comprising accessing a first maximum predicate instance record from a maximum predicate instance data structure using the first predicate type identifier, the first maximum predicate instance record indicating a number of instances of the first predicate type, a number of predicate instances described in response to the predicate type data corresponding to the number of instances of the first predicate type.

In Example 7, the subject matter of any one or more of Examples 1-6 optionally include the operations further comprising: accessing second predicate instance data describing a second predicate instance, the second predicate instance data comprising a first predicate type and a third argument value at a first predicate instance position of the second predicate instance; writing, to an arity data structure, a first arity record, the first arity record describing an arity of the second predicate instance; writing, to the node data structure, a second node record, the second node record comprising the first predicate type and a first predicate type identifier; writing, to the node data structure, a third node record, the third node record comprising the third argument value and a third argument identifier; and writing, to the node predicate position data structure, a second node predicate position data structure record, the second node predicate position data structure record describing, a third argument identifier describing the third argument value, a second predicate instance identifier describing the second predicate instance, and an indicator of the first predicate instance position of the second predicate instance.

In Example 8, the subject matter of any one or more of Examples 1-7 optionally include the operations further comprising: accessing a first query data, the first query data describing a first predicate type, a third argument value at a first predicate instance position, and a variable at a second predicate instance position; generating a variable query edge matrix describing predicate instances of the first predicate type having the third argument value at the first predicate instance position; and returning, in response to the first query data, a column of the variable query edge matrix corresponding to the second predicate instance position.

In Example 9, the subject matter of any one or more of Examples 1-8 optionally include the operations further comprising: accessing a first query data, the first query data describing a second predicate instance comprising a first predicate type, a third argument value at a first predicate instance position of the second predicate instance, and a fourth argument value at a second predicate instance position of the second predicate instance; generating a variable query edge matrix describing predicate instances of the first predicate type having the third argument value at the first predicate instance position and the fourth argument value at the second predicate instance position; determining that the variable query edge matrix describes at least one predicate instance of the first predicate type; and returning, in response to the first query data, an indication that the second predicate instance is true.

Example 10 is a method of storing data in a computing system, the method comprising: accessing argument data describing a first argument value; accessing a first record from a node data structure using the first argument value, the first record from the node data structure describing a first argument identifier; accessing a first node predicate position record from a node predicate position data structure using the first argument identifier, the first node predicate position record comprising a first predicate instance identifier and an indication of a first predicate instance position of a first predicate instance associated with the first predicate instance identifier; accessing a first position predicate node record from a position predicate node data structure using the first predicate instance identifier and a second position identifier describing a second predicate instance position of the first predicate instance, the first position predicate node record indicating a second argument identifier; and returning, in response to the argument data, first predicate instance data describing the first predicate instance, the first argument value at the first predicate instance position of the first predicate instance, and a second argument value associated with the second argument identifier at the second predicate instance position of the first predicate instance.

In Example 11, the subject matter of Example 10 optionally includes accessing a first arity record from an arity data structure using the first predicate instance identifier, the first arity record describing an arity of the first predicate instance associated with the first predicate instance identifier, the first predicate instance data comprising a number of arguments equivalent to the arity.

In Example 12, the subject matter of any one or more of Examples 10-11 optionally include accessing a second node predicate position record from a node predicate position data structure using the first argument identifier, the second node predicate position record comprising a second predicate instance identifier and an indication of a first predicate instance position of a second predicate instance associated with the second predicate instance identifier; accessing a second position predicate node record from the position predicate node data structure using the second predicate instance identifier and a second position identifier describing a second predicate instance position of the second predicate instance, the second position predicate node record indicating a third argument identifier; and returning, in response to the argument data, second predicate instance data describing the second predicate instance, the first argument value at the first predicate instance position of the second predicate instance, and a third argument value associated with the third argument identifier at the second predicate instance position of the second predicate instance.

In Example 13, the subject matter of any one or more of Examples 10-12 optionally include accessing predicate type data describing a first predicate type; accessing a second node record from the node data structure using the first predicate type, the second node record describing a first predicate type identifier; accessing a second position predicate node record from the position predicate node data structure using a second predicate instance indicator describing a second predicate instance of the first predicate type and an indication of a first predicate instance position of the second predicate instance, the second position predicate node record indicating a third argument identifier; and returning, in response to the predicate type data, second predicate instance data describing the second predicate instance and a third argument value associated with the third argument identifier at the first predicate instance position of the second predicate instance.

In Example 14, the subject matter of Example 13 optionally includes accessing a first arity record from an arity data structure using the second predicate instance indicator, the first arity record describing an arity of the second predicate instance, and the second predicate instance data describing a number of arguments corresponding to the arity of the second predicate instance.

In Example 15, the subject matter of any one or more of Examples 13-14 optionally include accessing a first maximum predicate instance record from a maximum predicate instance data structure using the first predicate type identifier, the first maximum predicate instance record indicating a number of instances of the first predicate type, a number of predicate instances described in response to the predicate type data corresponding to the number of instances of the first predicate type.

In Example 16, the subject matter of any one or more of Examples 10-15 optionally include accessing second predicate instance data describing a second predicate instance, the second predicate instance data comprising a first predicate type and a third argument value at a first predicate instance position of the second predicate instance; writing, to an arity data structure, a first arity record, the first arity record describing an arity of the second predicate instance; writing, to the node data structure, a second node record, the second node record comprising the first predicate type and a first predicate type identifier; writing, to the node data structure, a third node record, the third node record comprising the third argument value and a third argument identifier; and writing, to the node predicate position data structure, a second node predicate position data structure record, the second node predicate position data structure record describing, a third argument identifier describing the third argument value, a second predicate instance identifier describing the second predicate instance, and an indicator of the first predicate instance position of the second predicate instance.

In Example 17, the subject matter of any one or more of Examples 10-16 optionally include accessing a first query data, the first query data describing a first predicate type, a third argument value at a first predicate instance position, and a variable at a second predicate instance position; generating a variable query edge matrix describing predicate instances of the first predicate type having the third argument value at the first predicate instance position; and returning, in response to the first query data, a column of the variable query edge matrix corresponding to the second predicate instance position.

In Example 18, the subject matter of any one or more of Examples 10-17 optionally include accessing a first query data, the first query data describing a second predicate instance comprising a first predicate type, a third argument value at a first predicate instance position of the second predicate instance, and a fourth argument value at a second predicate instance position of the second predicate instance; generating a variable query edge matrix describing predicate instances of the first predicate type having the third argument value at the first predicate instance position and the fourth argument value at the second predicate instance position; determining that the variable query edge matrix describes at least one predicate instance of the first predicate type; and returning, in response to the first query data, an indication that the second predicate instance is true.

Example 19 is a non-transitory machine-readable medium comprising instructions thereon that, when executed by at least one processor, cause the at least one processor to perform operations comprising: accessing argument data describing a first argument value; accessing a first record from a node data structure using the first argument value, the first record from the node data structure describing a first argument identifier; accessing a first node predicate position record from a node predicate position data structure using the first argument identifier, the first node predicate position record comprising a first predicate instance identifier and an indication of a first predicate instance position of a first predicate instance associated with the first predicate instance identifier; accessing a first position predicate node record from a position predicate node data structure using the first predicate instance identifier and a second position identifier describing a second predicate instance position of the first predicate instance, the first position predicate node record indicating a second argument identifier; and returning, in response to the argument data, first predicate instance data describing the first predicate instance, the first argument value at the first predicate instance position of the first predicate instance, and a second argument value associated with the second argument identifier at the second predicate instance position of the first predicate instance.

In Example 20, the subject matter of Example 19 optionally includes the operations further comprising accessing a first arity record from an arity data structure using the first predicate instance identifier, the first arity record describing an arity of the first predicate instance associated with the first predicate instance identifier, the first predicate instance data comprising a number of arguments equivalent to the arity.

Figure 12:
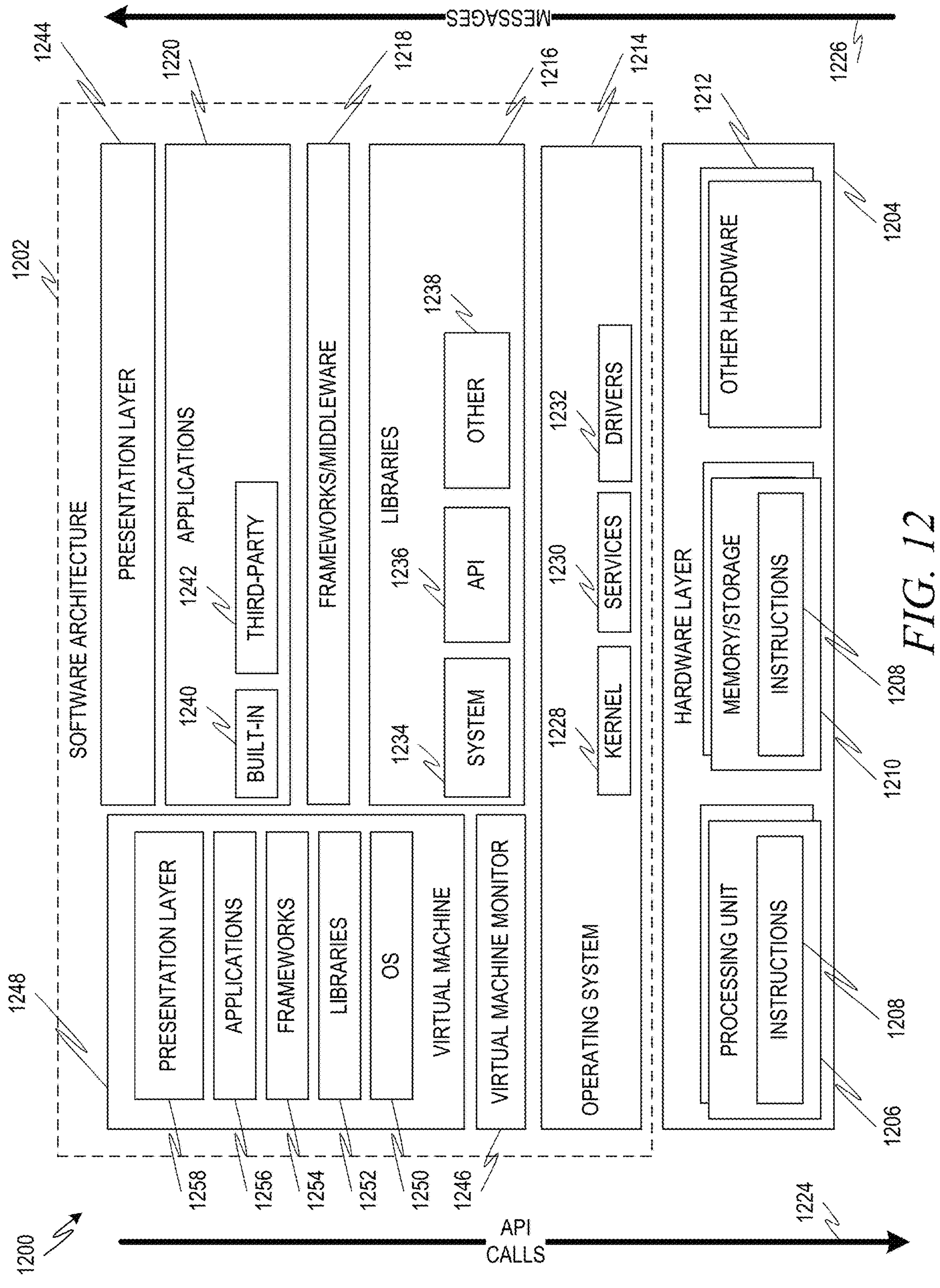
FIG. 12 is a block diagram showing one example of an architecture for a computing device.

FIG. 12 is a block diagram 1200 showing one example of a software architecture 1202 for a computing device. The architecture 1202 may be used in conjunction with various hardware architectures, for example, as described herein. FIG. 12 is merely a non-limiting example of a software architecture and many other architectures may be implemented to facilitate the functionality described herein. A representative hardware layer 1204 is illustrated and can represent, for example, any of the above referenced computing devices. In some examples, the hardware layer 1204 may be implemented according to the architecture of the computer system of FIG. 13.

The representative hardware layer 1204 comprises one or more processing units 1206 having associated executable instructions 1208. Executable instructions 1208 represent the executable instructions of the software architecture 1202, including implementation of the methods, modules, subsystems, and components, and so forth described herein and may also include memory and/or storage modules 1210, which also have executable instructions 1208. Hardware layer 1204 may also comprise other hardware as indicated by other hardware 1212 which represents any other hardware of the hardware layer 1204, such as the other hardware illustrated as part of the architecture 1202.

In the example architecture of FIG. 12, the software architecture 1202 may be conceptualized as a stack of layers where each layer provides particular functionality. For example, the software architecture 1202 may include layers such as an operating system 1214, libraries 1216, middleware layer 1218, applications 1220, and presentation layer 1244. Operationally, the applications 1220 and/or other components within the layers may invoke API calls 1224 through the software stack and access a response, returned values, and so forth illustrated as messages 1226 in response to the API calls 1224. The layers illustrated are representative in nature and not all software architectures have all layers. For example, some mobile or special purpose operating systems may not provide a middleware layer 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers. In some examples, the services 1230 include an interrupt service. The interrupt service may detect the receipt of an interrupt and, in response, cause the architecture 1202 to pause its current processing and execute an interrupt service routine (ISR) when an interrupt is accessed.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1216 may provide a common infrastructure that may be utilized by the applications 1220 and/or other components and/or layers. The libraries 1216 typically provide functionality that allows other software modules to perform tasks in an easier fashion than to interface directly with the underlying operating system 1214 functionality (e.g., kernel 1228, services 1230 and/or drivers 1232). The libraries 1216 may include system 1234 libraries (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The middleware layer 1218 (also sometimes referred to as frameworks) may provide a higher-level common infrastructure that may be utilized by the applications 1220 and/or other software components/modules. For example, the middleware layer 1218 may provide various graphic user interface (GUI) functions, high-level resource management, high-level location services, and so forth. The middleware layer 1218 may provide a broad spectrum of other APIs that may be utilized by the applications 1220 and/or other software components/modules, some of which may be specific to a particular operating system or platform.

The applications 1220 includes built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any of the built-in applications 1240 as well as a broad assortment of other applications. In a specific example, the third-party application 1242 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1242 may invoke the API calls 1224 provided by the mobile operating system such as operating system 1214 to facilitate functionality described herein.

The applications 1220 may utilize built-in operating system functions (e.g., kernel 1228, services 1230 and/or drivers 1232), libraries (e.g., system 1234, API libraries 1236, and other libraries 1238), and middleware layer 1218 to create user interfaces to interact with users of the system. Alternatively, or additionally, in some systems, interactions with a user may occur through a presentation layer, such as presentation layer 1244. In these systems, the application/module "logic" can be separated from the aspects of the application/module that interact with a user.

Some software architectures utilize virtual machines. In the example of FIG. 12, this is illustrated by virtual machine 1248. A virtual machine creates a software environment where applications/modules can execute as if they were executing on a hardware computing device. A virtual machine is hosted by a host operating system (operating system 1214) and typically, although not always, has a virtual machine monitor 1246, which manages the operation of the virtual machine as well as the interface with the host operating system (i.e., operating system 1214). A software architecture executes within the virtual machine such as an operating system 1250, libraries 1252, frameworks/middleware 1254, applications 1256 and/or presentation layer 1258. These layers of software architecture executing within the virtual machine 1248 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 13:
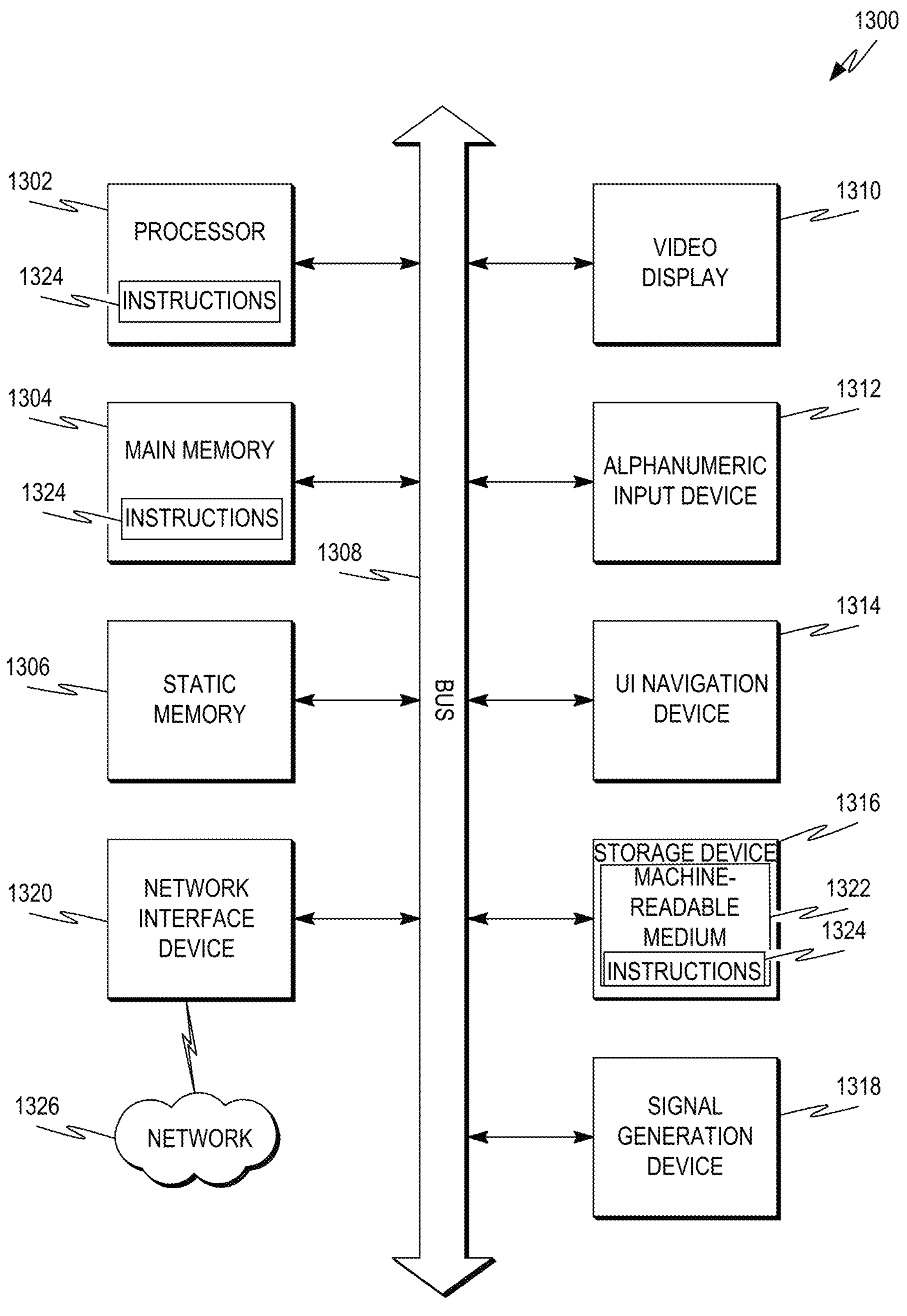
FIG. 13 is a block diagram of a machine in the example form of a computer system within which instructions may be executed for causing the machine to perform any one or more of the methodologies discussed herein.

FIG. 13 is a block diagram of a machine in the example form of a computer system 1300 within which instructions 1324 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU), or both), a main memory 1304, and a static memory 1306, which communicate with each other via a bus 1308. The computer system 1300 may further include a video display unit 1310 (e.g., a liquid crystal display (LCD) or a cathode ray tube (CRT)). The computer system 1300 also includes an alphanumeric input device 1312 (e.g., a keyboard or a touch-sensitive display screen), a user interface (UI) navigation (or cursor control) device 1314 (e.g., a mouse), a disk drive unit 1316, a signal generation device 1318 (e.g., a speaker), and a network interface device 1320.

Machine-Readable Medium

The disk drive unit 1316 includes a machine-readable medium 1322 on which is stored one or more sets of data structures and instructions 1324 (e.g., software) embodying or utilized by any one or more of the methodologies or functions described herein. The instructions 1324 may also reside, completely or at least partially, within the main memory 1304 and/or within the processor 1302 during execution thereof by the computer system 1300, with the main memory 1304 and the processor 1302 also constituting machine-readable media 1322.

While the machine-readable medium 1322 is shown in an example embodiment to be a single medium, the term "machine-readable medium" may include a single medium or multiple media (e.g., a centralized or distributed database, and/or associated caches and servers) that store the one or more instructions 1324 or data structures. The term "machine-readable medium" shall also be taken to include any tangible medium that is capable of storing, encoding, or carrying instructions 1324 for execution by the machine and that cause the machine to perform any one or more of the methodologies of the present disclosure, or that is capable of storing, encoding, or carrying data structures utilized by or associated with such instructions 1324. The term "machine-readable medium" shall accordingly be taken to include, but not be limited to, solid-state memories, and optical and magnetic media. Specific examples of machine-readable media 1322 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1324 may further be transmitted or received over a communications network 1326 using a transmission medium. The instructions 1324 may be transmitted using the network interface device 1320 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1324 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computing system for storing data, the computing system comprising:
- a database data storage comprising:
  - a node data structure comprising a plurality of node data structure records, a portion of the plurality of node data structure records relating respective argument values to respective argument identifiers;
  - a node predicate position data structure comprising a plurality of node predicate position data structure records, a portion of the plurality of node predicate position data structure records relating respective argument identifiers to respective predicate instance identifiers and respective predicate instance positions; and
  - a position predicate node data structure comprising a plurality of position predicate node data structure records, a portion of the plurality of position predicate node data structure records relating respective predicate instance identifiers, predicate position identifiers, and argument identifiers; and
- at least one processor programmed to perform operations comprising:
  - accessing argument data describing a first argument value;
  - querying the node data structure using the first argument value to identify a first argument identifier associated with the first argument value using a first node data structure record from the portion of the plurality of node data structure records, the first node data structure record comprising the first argument value and the first argument identifier;
  - querying the node predicate position data structure using the first argument identifier to identify a first node predicate position record from the portion of the plurality of node predicate position data structure records, the first node predicate position record comprising a first predicate instance identifier and an indication of a first predicate instance position of a first predicate instance associated with the first predicate instance identifier;
  - querying the position predicate node data structure using the first predicate instance identifier and a second position identifier describing a second predicate instance position of the first predicate instance to identify a first position predicate node data structure record of the portion of the plurality of position predicate node data structure records, the first position predicate node data structure record comprising the first predicate instance identifier, the second position identifier, and a second argument identifier; and
  - returning, in response to the argument data, first predicate instance data describing the first predicate instance, the first argument value at the first predicate instance position of the first predicate instance, and a second argument value associated with the second argument identifier at the second predicate instance position of the first predicate instance.

2. The computing system of claim 1, the operations further comprising accessing a first arity record from an arity data structure using the first predicate instance identifier, the first arity record describing an arity of the first predicate instance associated with the first predicate instance identifier, the first predicate instance data comprising a number of arguments equivalent to the arity.

3. The computing system of claim 1, the operations further comprising:
- querying the node predicate position data structure using the first argument identifier to identify a second node predicate position data structure record comprising a second predicate instance identifier and an indication of a first predicate instance position of a second predicate instance associated with the second predicate instance identifier;
- querying the node predicate position data structure using the second predicate instance identifier and a second position identifier describing a second predicate instance position of the second predicate instance to identify a second node predicate position data structure record comprising a third argument identifier; and
- returning, in response to the argument data, second predicate instance data describing the second predicate instance, the first argument value at the first predicate instance position of the second predicate instance, and a third argument value associated with the third argument identifier at the second predicate instance position of the second predicate instance.

4. The computing system of claim 1, the operations further comprising:
- accessing predicate type data describing a first predicate type;
- querying the node data structure using the first predicate type to identify a second node data structure record describing a first predicate type identifier;
- querying the position predicate node data structure using a second predicate instance indicator describing a second predicate instance of the first predicate type and an indication of a first predicate instance position of the second predicate instance to identify a second position predicate node data structure record comprising a third argument identifier; and
- returning, in response to the predicate type data, second predicate instance data describing the second predicate instance and a third argument value associated with the third argument identifier at the first predicate instance position of the second predicate instance.

5. The computing system of claim 4, the operations further comprising accessing a first arity record from an arity data structure using the second predicate instance indicator, the first arity record describing an arity of the second predicate instance, and the second predicate instance data describing a number of arguments corresponding to the arity of the second predicate instance.

6. The computing system of claim 4, the operations further comprising accessing a first maximum predicate instance record from a maximum predicate instance data structure using the first predicate type identifier, the first maximum predicate instance record indicating a number of instances of the first predicate type and a number of predicate instances described in response to the predicate type data corresponding to the number of instances of the first predicate type.

7. The computing system of claim 1, the operations further comprising:

accessing second predicate instance data describing a second predicate instance, the second predicate instance data comprising a first predicate type and a third argument value at a first predicate instance position of the second predicate instance;

writing, to an arity data structure, an arity record describing an arity of the second predicate instance;

writing, to the node data structure, a second node data structure record comprising the first predicate type and a first predicate type identifier;

writing, to the node data structure, a third node data structure record comprising the third argument value and a third argument identifier; and writing, to the node predicate position data structure, a second node predicate position data structure record describing, a third argument identifier describing the third argument value, a second predicate instance identifier describing the second predicate instance, and an indicator of the first predicate instance position of the second predicate instance.

8. The computing system of claim 1, the operations further comprising:

accessing first query data, the first query data describing a first predicate type, a third argument value at a first predicate instance position, and a variable at a second predicate instance position;

generating a variable query edge matrix describing predicate instances of the first predicate type having the third argument value at the first predicate instance position; and returning, in response to the first query data, a column of the variable query edge matrix corresponding to the second predicate instance position.

9. The computing system of claim 1, the operations further comprising:

accessing a first query data, the first query data describing a second predicate instance comprising a first predicate type, a third argument value at a first predicate instance position of the second predicate instance, and a fourth argument value at a second predicate instance position of the second predicate instance;

generating a variable query edge matrix describing predicate instances of the first predicate type having the third argument value at the first predicate instance position and the fourth argument value at the second predicate instance position;

determining that the variable query edge matrix describes at least one predicate instance of the first predicate type; and returning, in response to the first query data, an indication that the second predicate instance is true.

10. A method of storing data in a computing system, the method comprising:

accessing argument data describing a first argument value;

querying a node data structure using the first argument value to identify a first argument identifier associated with the first argument value using a first node data structure record from a node data structure, the first node data structure record comprising the first argument value and the first argument identifier;

querying a node predicate position data structure using the first argument identifier to identify a first node predicate position record from a node predicate position data structure, the first node predicate position record comprising a first predicate instance identifier and an indication of a first predicate instance position of a first predicate instance associated with the first predicate instance identifier;

querying a position predicate node data structure using the first predicate instance identifier and a second position identifier describing a second predicate instance position of the first predicate instance to identify a first position predicate node data structure record, the first position predicate node data structure record comprising the first predicate instance identifier, the second position identifier, and a second argument identifier; and returning, in response to the argument data, first predicate instance data describing the first predicate instance, the first argument value at the first predicate instance position of the first predicate instance, and a second argument value associated with the second argument identifier at the second predicate instance position of the first predicate instance.

11. The method of claim 10, further comprising accessing a first arity record from an arity data structure using the first predicate instance identifier, the first arity record describing an arity of the first predicate instance associated with the first predicate instance identifier, the first predicate instance data comprising a number of arguments equivalent to the arity.

12. The method of claim 10, further comprising:

querying the node predicate position data structure using the first argument identifier to identify a second node predicate position data structure comprising a second predicate instance identifier and an indication of a first predicate instance position of a second predicate instance associated with the second predicate instance identifier;

querying a node predicate position data structure using the second predicate instance identifier and a second position identifier describing a second predicate instance position of the second predicate instance to identify a second node predicate position data structure record comprising a third argument identifier; and returning, in response to the argument data, second predicate instance data describing the second predicate instance, the first argument value at the first predicate instance position of the second predicate instance, and a third argument value associated with the third argument identifier at the second predicate instance position of the second predicate instance.

13. The method of claim 10, further comprising:

accessing predicate type data describing a first predicate type;

querying the node data structure using the first predicate type to identify a second node data structure record describing a first predicate type identifier;

querying the position predicate node data structure using a second predicate instance indicator describing a second predicate instance of the first predicate type and an indication of a first predicate instance position of the second predicate instance to identify a second position predicate node data structure record comprising a third argument identifier; and returning, in response to the predicate type data, second predicate instance data describing the second predicate instance and a third argument value associated with the third argument identifier at the first predicate instance position of the second predicate instance.

14. The method of claim 13, further comprising accessing a first arity record from an arity data structure using the second predicate instance indicator, the first arity record describing an arity of the second predicate instance, and the second predicate instance data describing a number of arguments corresponding to the arity of the second predicate instance.

15. The method of claim 13, further comprising accessing a first maximum predicate instance record from a maximum predicate instance data structure using the first predicate type identifier, the first maximum predicate instance record indicating a number of instances of the first predicate type, a number of predicate instances described in response to the predicate type data corresponding to the number of instances of the first predicate type.

16. The method of claim 10, further comprising:

accessing second predicate instance data describing a second predicate instance, the second predicate instance data comprising a first predicate type and a third argument value at a first predicate instance position of the second predicate instance;

writing, to an arity data structure, an arity record describing an arity of the second predicate instance;

writing, to the node data structure, a second node data structure record relating the first predicate type and a first predicate type identifier;

writing, to the node data structure, a third node data structure record relating the third argument value and a third argument identifier; and writing, to the node predicate position data structure, a second node predicate position data structure record describing, a third argument identifier describing the third argument value, a second predicate instance identifier describing the second predicate instance, and an indicator of the first predicate instance position of the second predicate instance.

17. The method of claim 10, further comprising:

accessing first query data, the first query data describing a first predicate type, a third argument value at a first predicate instance position, and a variable at a second predicate instance position;

generating a variable query edge matrix describing predicate instances of the first predicate type having the third argument value at the first predicate instance position; and returning, in response to the first query data, a column of the variable query edge matrix corresponding to the second predicate instance position.

18. The method of claim 10, further comprising:

accessing a first query data, the first query data describing a second predicate instance comprising a first predicate type, a third argument value at a first predicate instance position of the second predicate instance, and a fourth argument value at a second predicate instance position of the second predicate instance;

generating a variable query edge matrix describing predicate instances of the first predicate type having the third argument value at the first predicate instance position and the fourth argument value at the second predicate instance position;

determining that the variable query edge matrix describes at least one predicate instance of the first predicate type; and returning, in response to the first query data, an indication that the second predicate instance is true.

19. A non-transitory machine-readable medium comprising instructions thereon that, when executed by at least one processor, cause the at least one processor to perform operations comprising:

accessing argument data describing a first argument value;

querying a node data structure using the first argument value to identify a first argument identifier associated with the first argument value using a first node data structure record from a node data structure using the first argument value, the first node data structure record comprising the first argument value and the first argument identifier;

querying a node predicate position data structure using the first argument identifier to identify a first node predicate position record from a node predicate position data structure, the first node predicate position record comprising a first predicate instance identifier and an indication of a first predicate instance position of a first predicate instance associated with the first predicate instance identifier;

querying the position predicate node data structure using the first predicate instance identifier and a second position identifier describing a second predicate instance position of the first predicate instance to identify a first position predicate node data structure record, the first position predicate node data structure record comprising the first predicate instance identifier, and the second position identifier a second argument identifier; and returning, in response to the argument data, first predicate instance data describing the first predicate instance, the first argument value at the first predicate instance position of the first predicate instance, and a second argument value associated with the second argument identifier at the second predicate instance position of the first predicate instance.

20. The non-transitory machine-readable medium of claim 19, the operations further comprising accessing a first arity record from an arity data structure using the first predicate instance identifier, the first arity record describing an arity of the first predicate instance associated with the first predicate instance identifier, the first predicate instance data comprising a number of arguments equivalent to the arity.

* * * * *